US007830137B2

(12) United States Patent
Okuno et al.

(10) Patent No.: US 7,830,137 B2
(45) Date of Patent: Nov. 9, 2010

(54) POSITION DETECTING SENSOR

(75) Inventors: Haruhiko Okuno, Koshigaya (JP); Norimasa Ozaki, Moriya (JP); Gen Uchimido, Moriya (JP); Katsumi Kobayashi, Bando (JP)

(73) Assignee: SMC Kabushiki Kaisha, Tokyo (JP)

( * ) Notice: Subject to any disclaimer, the term of this patent is extended or adjusted under 35 U.S.C. 154(b) by 629 days.

(21) Appl. No.: 11/781,952

(22) Filed: Jul. 24, 2007

(65) Prior Publication Data

US 2008/0022789 A1 Jan. 31, 2008

(30) Foreign Application Priority Data

Jul. 28, 2006 (JP) ............................. 2006-205840
Jun. 19, 2007 (JP) ............................. 2007-161285

(51) Int. Cl.
*G01B 7/14* (2006.01)

(52) U.S. Cl. ................................................. 324/207.24

(58) Field of Classification Search ....................... None
See application file for complete search history.

(56) References Cited

U.S. PATENT DOCUMENTS 7,250,753 B2 * 7/2007 Terasaki ................ 324/207.24
2002/0014128 A1 2/2002 Kroll et al.

FOREIGN PATENT DOCUMENTS

| | | |
|---|---|---|
| DE | 39 00 105 | 8/1989 |
| DE | 29 18 294 | 4/1990 |
| DE | 299 04 367 | 5/1999 |
| EP | 1 037 021 | 1/2005 |
| GB | 2 020 746 | 11/1979 |
| JP | 03-007507 | 1/1991 |
| JP | 03-046005 | 4/1991 |
| JP | 04-063803 | 5/1992 |
| JP | 04-253131 | 9/1992 |
| JP | 5-89910 | 12/1993 |
| JP | 07-0019603 | 4/1995 |
| JP | 08-074812 | 3/1996 |
| JP | 11-190309 | 7/1999 |
| JP | 2001-263311 | 9/2001 |
| JP | 2004-150517 | 5/2004 |
| JP | 2005-009606 | 1/2005 |
| JP | 2005-163941 | 6/2005 |
| JP | 2006-052744 | 2/2006 |
| KR | 10-2004-0038632 | 5/2004 |

* cited by examiner

*Primary Examiner*—Robert R Raevis
(74) *Attorney, Agent, or Firm*—Paul A. Guss

(57) ABSTRACT

A position detecting sensor is equipped with a holder capable of accommodating a sensor member therein on which a magnetic sensor is disposed. A connector formed on an end of the holder is connected to a fitting through a connecting bolt. The fitting is disposed by insertion into a sensor groove of a cylinder apparatus, and after insertion of the fitting into the sensor groove, the holder and the fitting are fastened by the connecting bolt, thereby fixing the holder with respect to the cylinder apparatus.

10 Claims, 22 Drawing Sheets

POSITION DETECTING SENSOR

BACKGROUND OF THE INVENTION

1. Field of the Invention

The present invention relates to a position detecting sensor for application, for example, to an actuator or the like and which is capable of detecting a displacement amount.

2. Description of the Related Art

Heretofore, a position detecting sensor has been used for detecting a displacement position of a piston in an actuator or the like. The position detecting sensor, for example, is installed in an installation groove formed along an outer side surface of the actuator, and is equipped with a housing that is inserted into the installation groove, a detector disposed inside the housing, which is capable of detecting displacement of the piston, and a screw that is threaded into an end of the housing. The position detecting sensor is arranged in a movable manner along the installation groove via the housing.

More specifically, after the position detecting sensor is moved to a desired position along the installation groove corresponding to a detection position of the piston, an end of the screw abuts against a bottom side of the installation groove by threaded rotation of the screw, whereby the housing is pressed toward an inner wall surface of the installation groove. As a result, the position detecting sensor contained within the housing is fixed with respect to the installation groove under a pressing action against the inner wall surface of the installation groove. (See, for example, United States Patent Application Publication No. 2002/0014128).

However, according to the conventional technique disclosed in United States Patent Application Publication No. 2002/0014128, when the position detecting sensor is fixed with respect to the installation groove, such fixing occurs after the housing has been displaced within the installation groove in a direction that separates away from the piston. Therefore, the distance between the detector disposed internally within the housing and the piston, changes with respect to a preset distance that is set beforehand. In greater detail, the distance between the detector and the piston becomes greater than the preset distance. Stated another way, the relative positional relationship between the detector housing and the actuator changes, and therefore the detection accuracy of the piston position by the detector is lowered.

Further, when the position detecting sensor is fixed, the housing is pressed at an excessive force against the inner wall surface of the installation groove. Therefore, when the housing is formed from a resin material, there is a concern that the load applied to the position detecting sensor increases and durability of the sensor is lowered.

SUMMARY OF THE INVENTION

A general object of the present invention is to provide a position detecting sensor, which can be reliably and stably fixed with respect to an actuator, and further, wherein detection accuracy by the detector can be improved, together with improving durability of the position detecting sensor.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
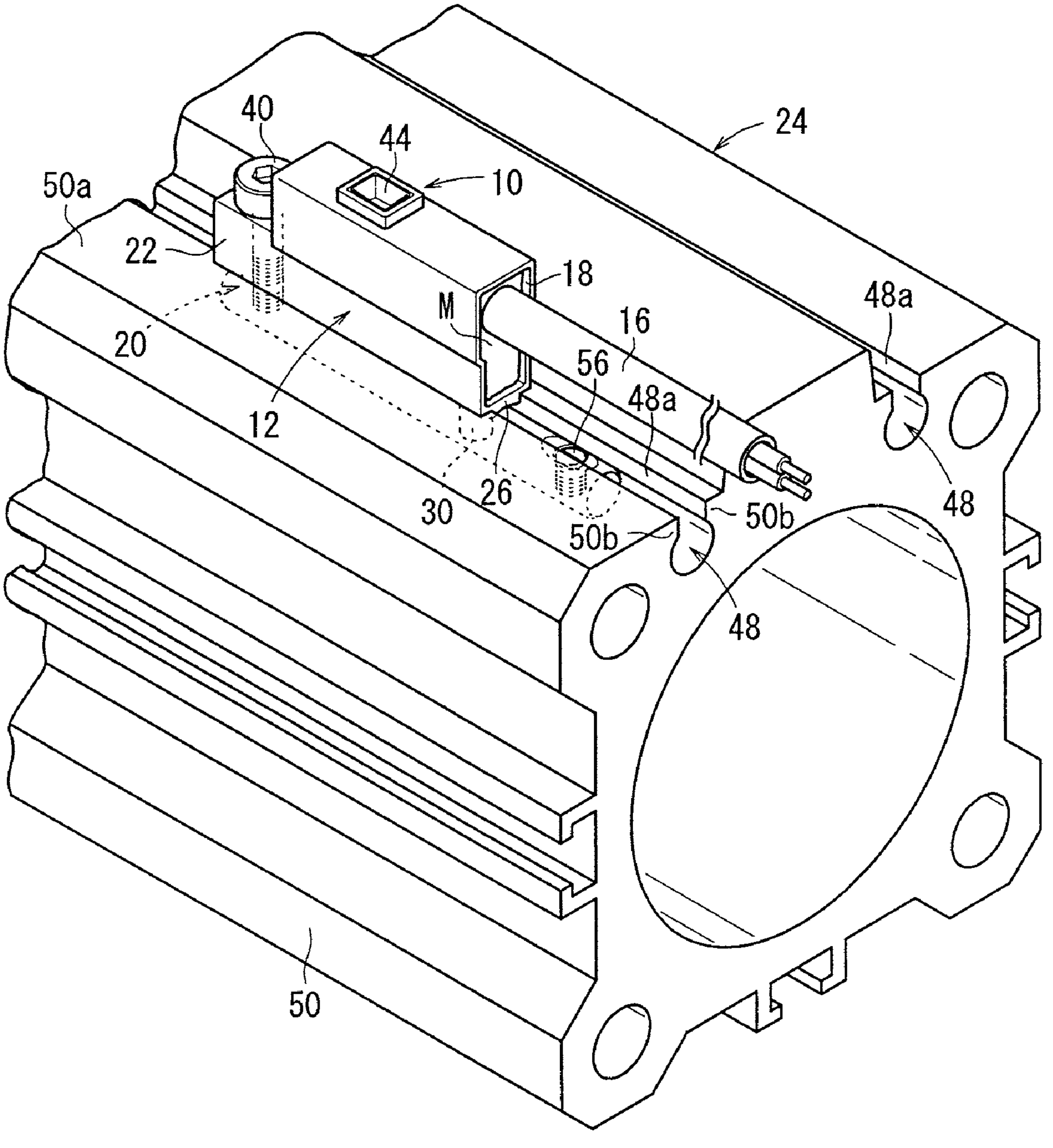
FIG. 1 is an exterior perspective view showing a cylinder apparatus to which a position detecting sensor according to an embodiment of the present invention is fitted by a fitting.

The position detecting sensor 10, as shown in FIGS. 1 to 6, includes a hollow holder 12 formed from a resin material, a sensor 14 inserted into the holder 12, and lead wires 16 connected to an end of the sensor 14.

The holder 12 is approximately rectangular in cross section having a bottomed tubular shape, and includes an opening 18 disposed on one end thereof into which a sensor 14 is inserted, a connector 22 disposed on the other end and connected with respect to a fitting 20, to be described later, an engaging projection 26 that projects from a bottom side surface 12*a* for engagement with one side of a cylinder apparatus (actuator) 24, and a pin (engagement member) 30 disposed on the bottom side surface 12*a*, which engages in a pin hole 28 of the fitting 20.

The opening 18 is roughly rectangular in cross section, wherein the sensor 14, with lead wires 16 connected thereto, is inserted through the opening 18 (see FIG. 6) into the holder 12. Also, a molten resin material M (for example, a thermoplastic resin) is filled and hardened inside the holder 12. As a result, the sensor 14 is fixed and formed integrally in the interior of the holder 12. The lead wires 16 are maintained such that the lead wires 16 are exposed to the outside from the opening 18 of the holder 12.

The sensor 14 includes a substrate 36 having disposed thereon a magnetic sensor (detector) 32 that is capable of detecting the position of a piston 31 (see FIG. 5) inside the cylinder apparatus 24, and an electroluminescent lamp 34 that is illuminated when the piston 31 is detected by the magnetic sensor 32, and wherein the lead wires 16 are connected to the substrate 36. In further detail, magnetism from a magnet 37 (see FIG. 5), which is installed in an annular groove on the outer peripheral surface of the piston 31, is detected by the magnetic sensor 32, thereby enabling the position of the piston 31 to be detected.

The connector 22 is disposed so as to project from the other end of the holder 12, wherein a bottom surface of the connector 22 on a side of the cylinder apparatus 24 is formed on the substantially same level with respect to the bottom surface of the holder 12. In addition, the upper surface of the connector 22 is arranged lower than the upper surface of the holder 12 (see FIG. 6). More specifically, the connector 22 is formed as a stepped portion.

Further, a bolt hole 38, which penetrates in a direction substantially perpendicular to the axis of the holder 12, is formed in the connector 22, wherein a connecting bolt (connecting member) 40 connecting the holder 12 and the fitting 20 is inserted through the bolt hole 38.

The engaging projection 26 is disposed in a substantially central location on the bottom side surface 12*a* of the holder 12 and projects a predetermined height (refer to H in FIG. 8) from the bottom side surface 12*a* toward the side of the cylinder apparatus 24. The engaging projection 26 extends along the axial direction of the holder 12, having a longitudinal dimension roughly equal to that of the holder 12. That is, the engaging projection 26 extends in a straight line from one end of the holder 12 to the other end thereof.

Further, the bottom surface of the engaging projection 26 includes a circular arc shaped curved surface 42, which is recessed or curved inwardly at a predetermined radius of curvature toward the holder 12. The radius of curvature of the curved surface 42 is set to be roughly equal to that of the fitting 20, to be described later.

A pin 30, which projects toward a side of the cylinder apparatus 24 from the bottom side surface 12*a*, is formed on one end of the holder 12. The pin 30 is formed axially, with a predetermined diameter. That is, the pin 30 projects in the same direction as the engaging projection 26, and since the pin 30 is disposed substantially perpendicularly to the axis of the holder 12, the pin 30 lies substantially parallel to and is separated a predetermined distance from the bolt hole 38 of the connector 22.

On the other hand, a display window 44 is disposed on an upper surface of the holder 12, in confronting relation to the electroluminescent lamp 34 of the sensor 14 that is inserted inside of the holder 12. The display window 44 is made, for example, from a transparent resin material and is installed and sealed in a hole 46 of the holder 12. Specifically, because the interior of the holder 12 can be visually perceived from the outside through the display window 44, it can be confirmed from outside of the holder 12 when the electroluminescent lamp 34 is illuminated.

A columnar shaped fitting 20, for fixing the position detecting sensor 10 including the holder 12 with respect to the cylinder apparatus 24, is disposed at a lower portion of the holder 12.

The fitting 20, for example, is formed in the shape of a shaft from a metal material such as brass or the like, with a length that is greater, by a predetermined length, than the axial length of the holder 12. The fitting 20 is inserted through a sensor groove 48 of the cylinder apparatus 24.

The sensor groove 48 is formed as a groove recessed into an outer side surface 50*a* of the cylinder tube 50 constituting the cylinder apparatus 24, and penetrates in a straight line from one end of the cylinder tube 50 to the other end thereof (see FIG. 1).

Further, the sensor groove 48 has a substantially circular cross sectional shape, and communicates with the outside through a communicating part 48*a* disposed between the sensor groove 48 and the outer side surface 50*a* of the cylinder tube 50. The communicating part 48*a* has a predetermined width that is narrower than the diameter of the circular shaped region in the sensor groove 48. Further, swollen portions 50*b* are formed on the cylinder tube 50, which expand in directions facing toward the communicating part 48*a*. These elements, including the communicating part 48*a*, function collectively as the sensor groove 48.

The radius of the circular shaped region of the sensor groove 48 is substantially the same or just slightly larger than the radius of the fitting 20. In this case, the communicating part 48*a* of the sensor groove 48 opens toward the outer side surface of the cylinder tube 50, such that the engaging projection 26 of the holder 12 is inserted into the communicating part 48*a*. The widthwise dimension of the communicating part 48*a* in the sensor groove 48 is substantially the same or just slightly larger than the widthwise dimension of the engaging projection 26.

The fitting 20 includes a first screw hole 52 formed on one end of the fitting 20 and penetrating in a substantially perpendicular direction to the axis of the fitting 20, a pin hole 28 separated a predetermined distance from the first screw hole 52, through which a pin 30 of the holder 12 is inserted, and a second screw hole 54 formed at the other end of the fitting 20. The one end of the fitting 20 is positioned toward a side of the connector 22 of the holder 12, and the other end thereof is positioned proximate the opening 18 of the holder 12.

Figure 4:
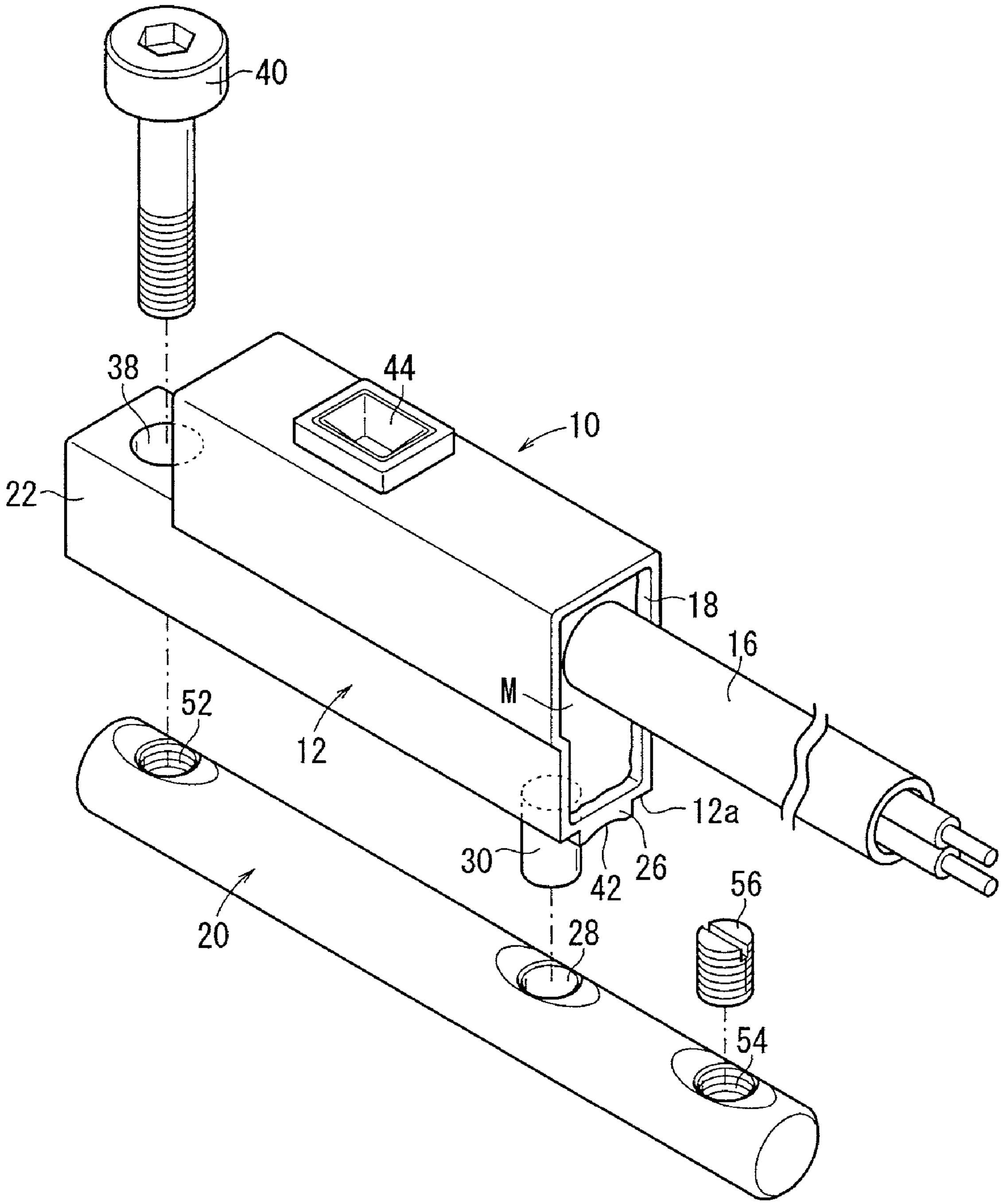
FIG. 4 is an exploded perspective view showing a state in which the fitting is detached from the position detecting sensor shown in FIG. 2.
Figure 5:
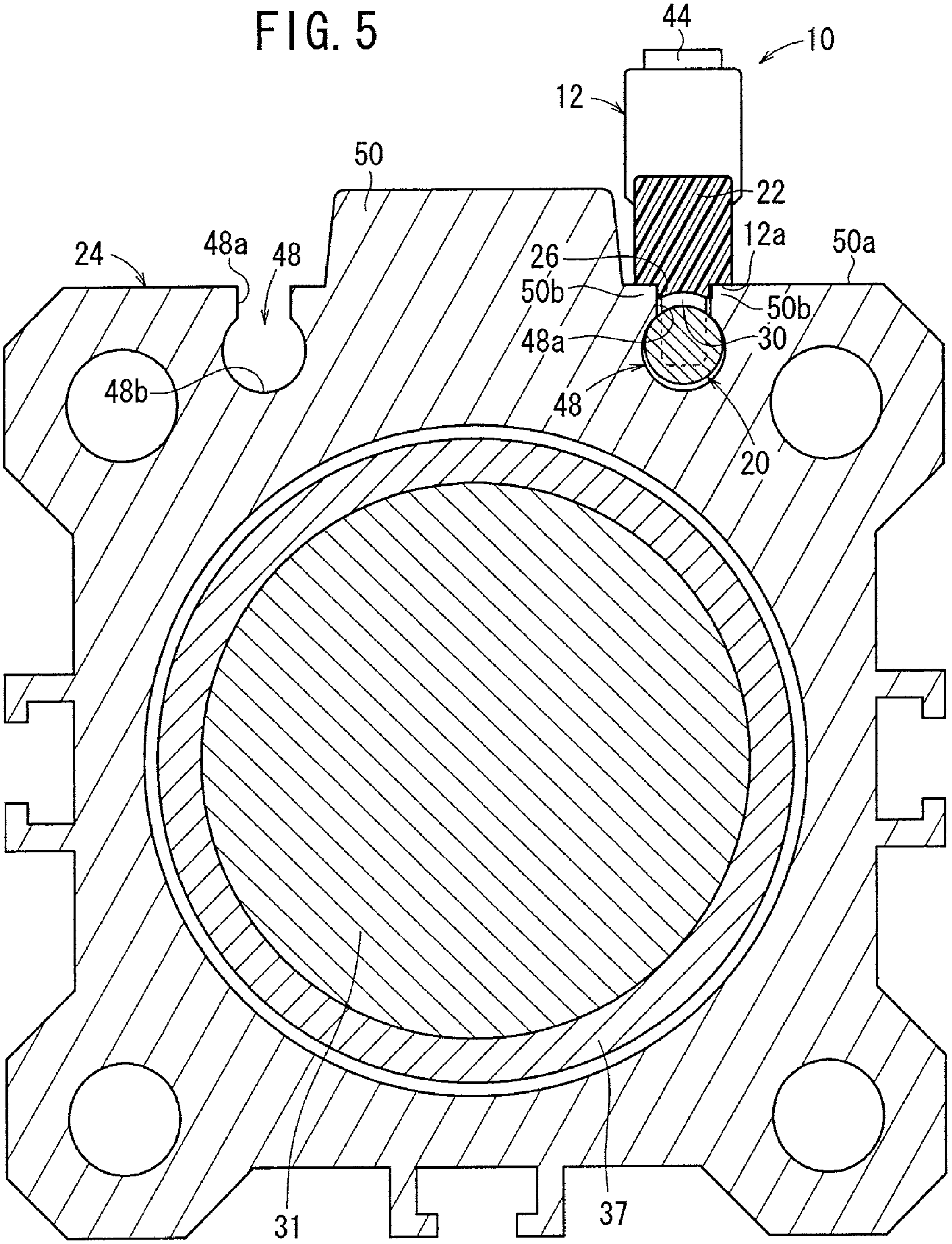
FIG. 5 is a vertical cross sectional view showing a cylinder apparatus having the position detecting sensor of FIG. 1 fitted thereto through a fitting.
Figure 6:
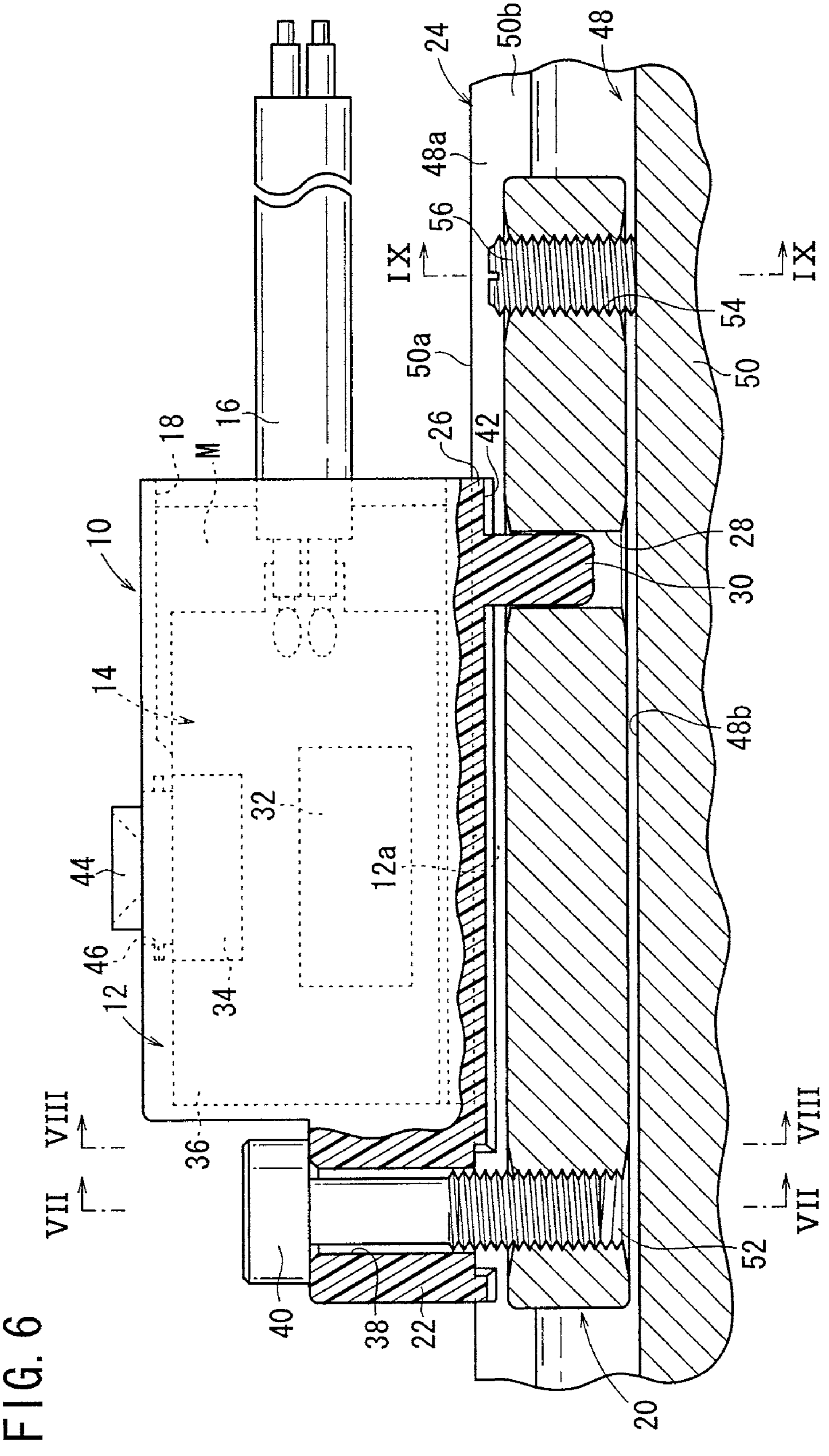
FIG. 6 is a vertical cross sectional view showing a state in which the position detecting sensor shown in FIG. 1 is fitted to the cylinder apparatus through a fitting.

The pin hole 28 is formed substantially in parallel with the first and second screw holes 52, 54 and opens in the same directions, with the screw holes 52, 54 being separated mutually by predetermined distances from the pin hole 28 (see FIGS. 4 and 6). Further, the distance between the first screw hole 52 and the pin hole 28 along the axial direction of the fitting 20 is substantially equal to the distance between the bolt hole 38 and the pin 30 along the axial direction of the holder 12.

The first screw hole 52 is arranged in a position that faces the bolt hole 38 when the holder 12 is fitted to the fitting 20, and the connecting bolt 40 that penetrates through the bolt hole 38 is screw-engaged therewith. As a result, the position detecting sensor 10 including the holder 12 is connected with the fitting 20. At this time, the pin 30 of the holder 12 is inserted into the pin hole 28, and as a result, the holder 12 is both positioned and fitted to the fitting 20 through the connecting bolt 40 and the pin 30.

Figure 2:
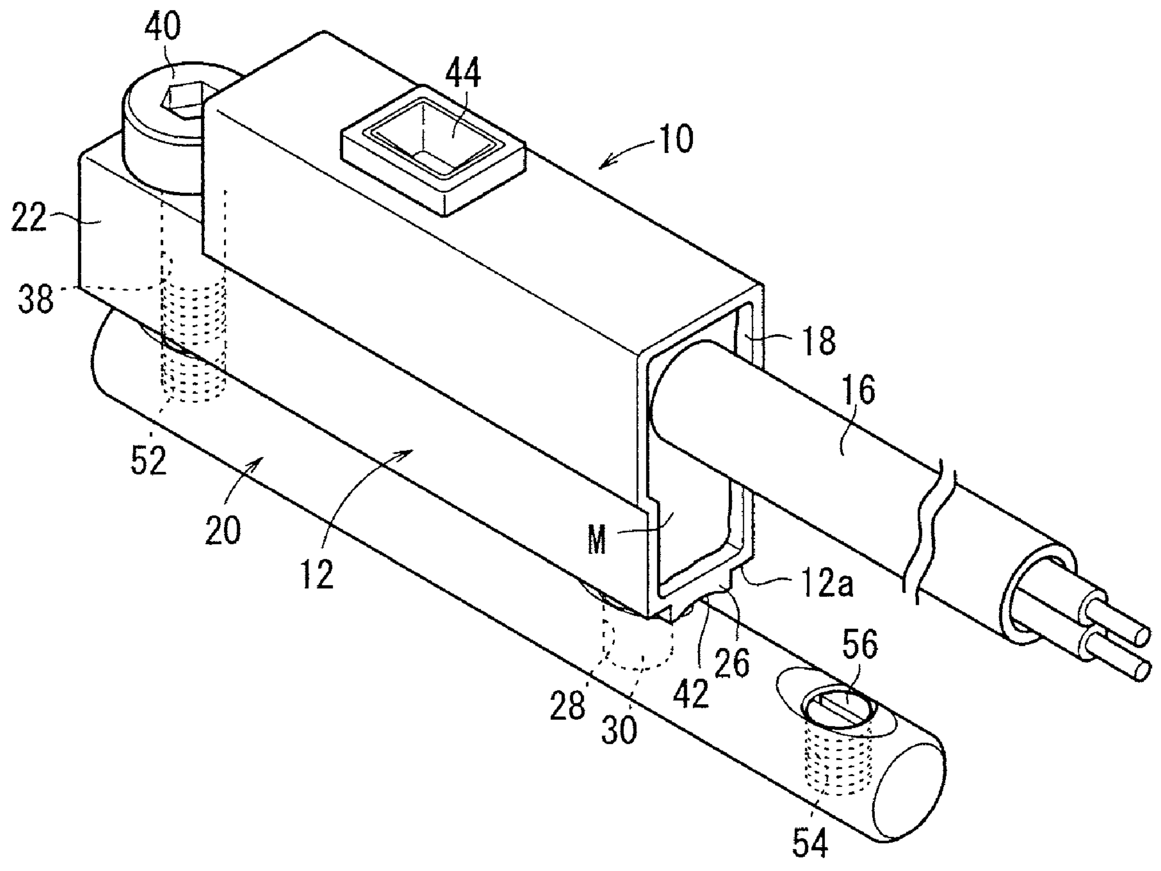
FIG. 2 is an exterior perspective view showing a state in which the position detecting sensor and the fitting shown in FIG. 1 are connected.

More specifically, the fitting 20 is attached such that the other end thereof, having the second screw hole 54 formed therein, projects a fixed distance from the end of the holder 12 (see FIG. 2).

A fixing screw (fixing member) 56, which fixes the fitting 20 with respect to the sensor groove 48, is threaded in the second screw hole 54, and is displaceable in an axial direction along the second screw hole 54 under a screw-turning action of the fixing screw 56. In addition, as a result of displacement and projecting of the fixing screw 56 toward the bottom 48*b* of the sensor groove 48, the fitting 20 is pushed upwardly by the fixing screw 56 in a direction (toward the side of the communicating part 48*a*) so as to separate away from the bottom 48*b*. Thus, the fitting 20 is pressed in a state of abutment against the inner wall surface of the sensor groove 48. Owing thereto, movement of the fitting 20 is regulated and fixed under a contact action of the fitting 20 with the sensor groove 48.

Further, the aforementioned fitting 20 has been described concerning a case in which the fitting 20 is formed as a non-hollow shaft having a circular cross section, however, the invention is not limited by this feature. For example, the fitting 20 may also have a quadrilateral cross section, which corresponds to the sensor groove 48 having a similar quadrilateral cross sectional shape. Moreover, the fitting 20 may be formed in a hollow cylindrical shape. Specifically, when the position detecting sensor 10 including the holder 12 is connected and fitted onto the cylinder apparatus 24, so long as the fitting 20 possesses sufficient strength, the shape of the fitting 20 is not particularly limited.

The position detecting sensor 10 according to the embodiment of the present invention is basically constructed as described above. Next, a case in which the position detecting sensor 10 is fitted onto the cylinder apparatus 24 through the fitting 20 shall be explained.

First, the fitting 20 is connected with respect to the holder 12 that constitutes the position detecting sensor 10. In this case, as shown in FIG. 4, the fitting 20 is arranged on a bottom side surface 12*a* of the holder 12, and the pin 30 of the holder 12 is inserted into the pin hole 28 (see FIG. 8). Along therewith, the connecting bolt 40 inserted through the bolt hole 38 is threaded into the first screw hole 52 of the fitting 20. At this time, the holder 12 and the fitting 20 are disposed in parallel, and the pin 30 is inserted into the pin hole 28, whereby the holder 12 is positioned with respect to the fitting 20. Further, by turning the fitting 20 about the center of the pin 30 such that the first screw hole 52 matches up with the bolt hole 38 of the holder 12, the first screw hole 52 can be arranged so as to face the bolt hole 38. In this way, by first engaging the pin 30 within the pin hole 28, the bolt hole 38 and the first screw hole 52 can easily be arranged so as to coincide on the same line.

In addition, by threaded engagement of the connecting bolt 40, which is inserted through the bolt hole 38, with respect to the first screw hole 52, the position detecting sensor 10 including the holder 12 becomes integrally connected with the fitting 20 by means of the connecting bolt 40 (see FIG. 2). Since one end of the holder 12 is maintained on the fitting 20 through the pin 30, whereas the other end is maintained on the fitting 20 by the connecting bolt 40, the holder 12 can be even more firmly connected and made integral with the fitting 20.

Moreover, the holder 12 and the fitting 20 are connected together in a state wherein a clearance of a predetermined distance is secured between the engaging projection 26 of the holder 12 and the fitting 20.

Next, the position detecting sensor 10 connected to the fitting 20 is assembled onto the cylinder apparatus 24. In this case, the fitting 20 is inserted into an open end of the sensor groove 48 in the cylinder apparatus 24. The fitting 20 is inserted through the sensor groove 48 such that the position detecting sensor 10 is disposed externally with respect to the outer side surface 50*a* of the cylinder tube 50, via the communicating part 48*a* of the sensor groove 48.

In addition, the position detecting sensor 10 is moved along the sensor groove 48 together with the fitting 20, and after being moved to a desired position that enables detection of the position of the piston 31 by the position detecting sensor 10, the position detecting sensor 10 is fixed at the desired position.

Figure 7:
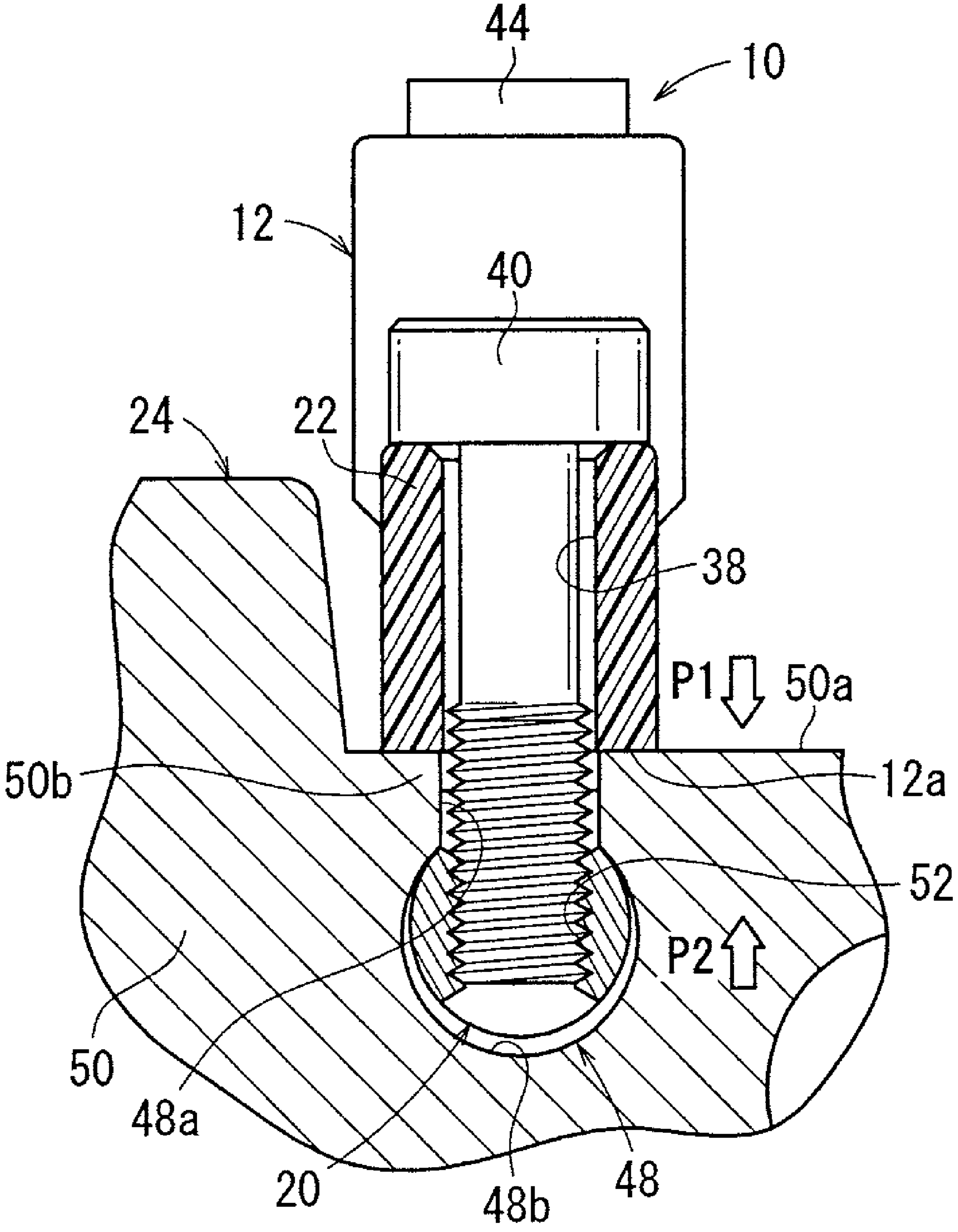
FIG. 7 is a cross sectional view taken along line VII-VII of FIG. 6.

When fixing the position detecting sensor 10 in this manner, by turning the connecting bolt 40 that penetrates through the holder 12, the connector 22 of the holder 12 and the fitting 20 are pulled in directions to mutually approach each other. Further, the bottom side surface 12*a* of the holder 12 is pressed in a state of abutment against the outer side surface 50*a* of the cylinder tube 50, and the outer circumferential surface of the fitting 20 abuts and is pressed against the inner wall surface of the sensor groove 48 (see FIG. 7). As a result, the communicating part 48*a* of the sensor groove 48 is gripped, and the swollen portions 50*b* of the cylinder tube 50 are placed in a state of being clamped by the holder 12 and the fitting 20.

Stated otherwise, the bottom side surface 12*a* of the holder 12 is pressed at a given pressing force P1 and by a clamping force of the connecting bolt 40 against the outer side surface 50*a* of the cylinder tube 50. On the other hand, the outer circumferential surface of the fitting 20 is pressed at a given pressing force P2 against the inner wall surface of the sensor groove 48 (see FIG. 7).

Figure 8:
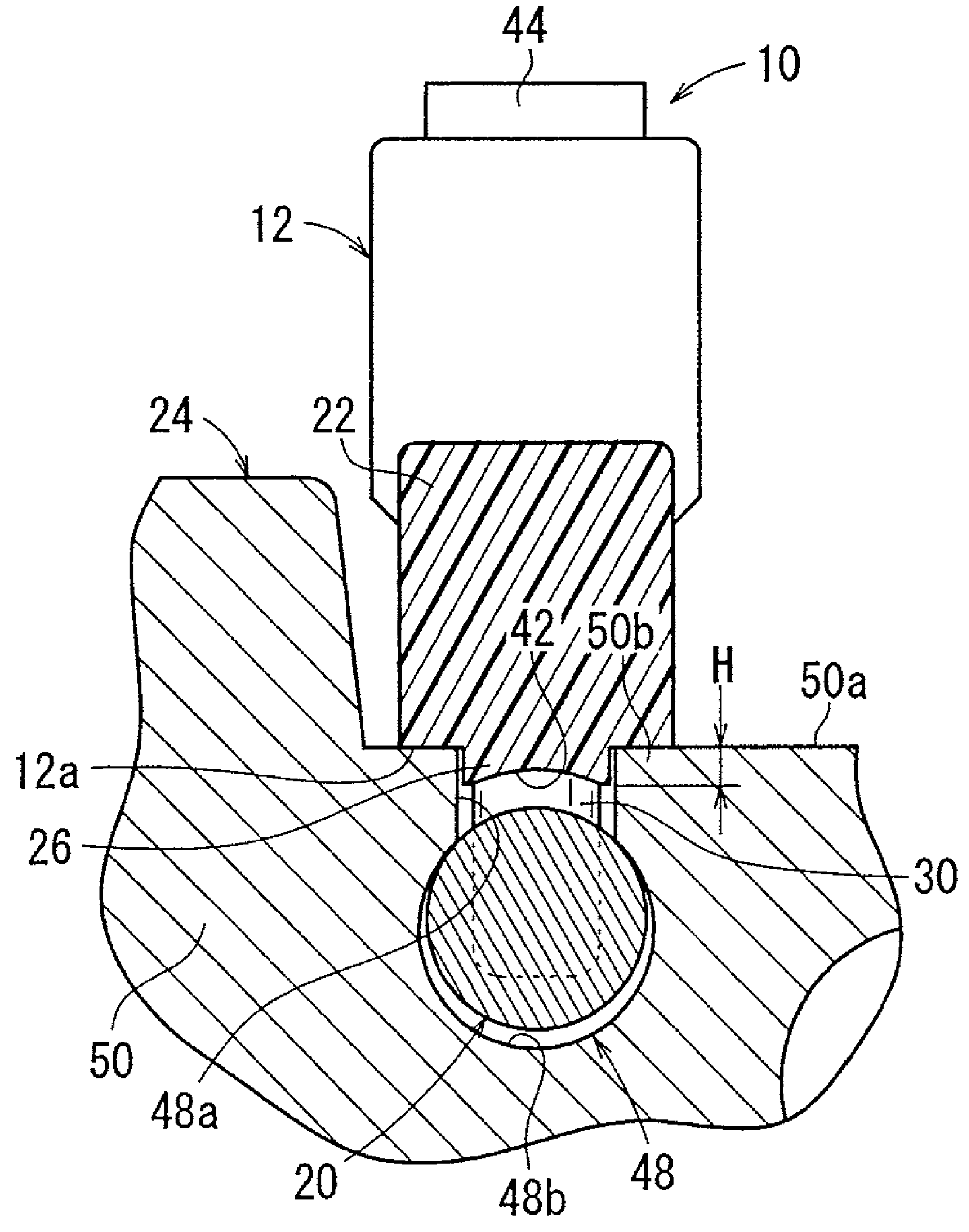
FIG. 8 is a cross sectional view taken along line VIII-VIII of FIG. 6.

As a result, the position detecting sensor 10 is fixed by the holder 12 and the fitting 20 at a desired position with respect to the sensor groove 48. In this case, as shown in FIG. 8, the engaging projection 26 of the holder 12 and the outer circumferential surface of the fitting 20 are set so as to be separated by a predetermined distance.

Figure 9:
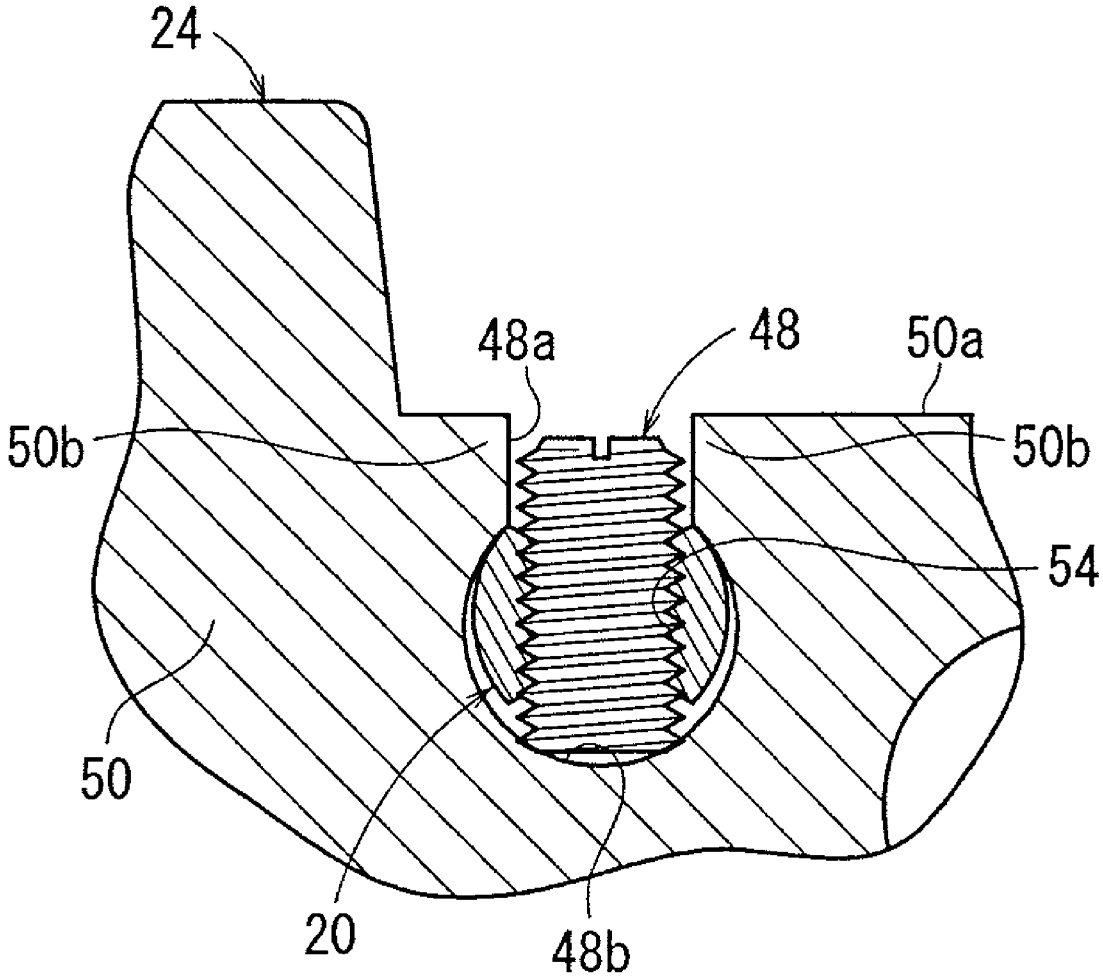
FIG. 9 is a cross sectional view taken along line IX-IX of FIG. 6.

Finally, the fixing screw 56, which is threaded in the second screw hole 54 of the fitting 20, is turned, and the fixing screw 56 is displaced while projecting toward the bottom 48*b* of the sensor groove 48, whereby the fitting 20 is pressed upwardly toward the side of the communicating part 48*a* of the sensor groove 48. As a result, the outer circumferential surface of the fitting 20 is pressed against the inner wall surface of the sensor groove 48, and is fixed under a contact action therewith (see FIG. 9). More specifically, the position detecting sensor 10 is fixed with respect to the cylinder apparatus 24 by gripping the swollen portions 50*b* of the cylinder tube 50 between the holder 12 and the fitting 20, and in addition, because the fitting 20 is fixed with respect to the sensor groove 48 through the fixing screw 56, the position detecting sensor 10 is fixed firmly and securely.

In the foregoing manner, in the embodiment of the invention, when the position detecting sensor 10 is fitted onto the cylinder apparatus 24, and after the fitting 20 has been installed beforehand onto the bottom side surface 12*a* of the position detecting sensor 10, the fitting 20 is inserted through the sensor groove 48 of the cylinder apparatus 24. Further, under a screwing action of the connecting bolt 40, the holder 12 constituting the position detecting sensor 10 and the fitting 20 are displaced so as to mutually approach one another, and are fixed by gripping therebetween the swollen portions 50*b* of the sensor groove 48 in the cylinder apparatus 24.

In this manner, since positioning is performed through abutment of the bottom side surface 12*a* of the holder 12, in which the sensor 14 is accommodated, against the outer side surface 50*a* of the cylinder tube 50, when the position detecting sensor 10 is fixed, changes in the mutual positional relationship of the holder 12 and the cylinder tube 50 do not occur. Specifically, a fixed distance is maintained between the magnetic sensor 32 inside the holder 12 and the piston 31 arranged inside the cylinder tube 50, whereby a stable detection result by the magnetic sensor 32 can be obtained. Stated otherwise, compared to the fitting structure used in the conventional position detecting sensor, in which changes in relative positioning of the position detecting sensor and the piston tend to occur when the position detecting sensor is affixed inside of the installation groove, by means of the position detecting sensor 10 of the present invention, detection accuracy can be improved.

Further, because the fitting 20 is fixable with respect to the sensor groove 48 by the fixing screw 56, which is threaded into the second screw hole 54, the connecting bolt 40 can be screw-rotated and the position detecting sensor 10 including the holder 12 can be detached by itself from the fitting 20, in a state in which the fitting 20 remains installed as is within the sensor groove 48.

As a result, maintenance operations including exchanging or replacing the position detecting sensor 10 can easily be performed, making it possible to newly assemble another position detecting sensor, having different specifications, onto the fitting 20 and make use of the same.

For example, in the case that a different position detecting sensor is installed on the cylinder apparatus 24, owing to the fact that the position detecting sensor is assembled onto a fitting 20 which has already been fixed beforehand, installation thereof at a position capable of detecting the position of the piston 31 can be easily and swiftly accomplished. Namely, difficult and complex operations of readjusting the position of the position detecting sensor 10 on the cylinder apparatus 24 are unnecessary, and reproducibility of the installation position of the position detecting sensor 10 on the cylinder apparatus 24 can be enhanced.

Furthermore, because the fitting 20 is made from a metallic material, when the position detecting sensor 10 is fixed in the sensor groove 48, even when the fitting 20 is pressed against the inner wall surfaces of the sensor groove 48, the fitting 20 is not deformed and durability of the fitting 20 is not lowered. Further, compared to a case in which the fitting 20 is made of a resin material, since the strength of the fitting 20 is enhanced, the fastening force (fastening torque) at which the connecting bolt 40 is screw-engaged with the fitting 20 can be set at a larger value. As a result, the position detecting sensor 10 can be firmly and stably fixed with respect to the cylinder apparatus 24 by the connecting bolt 40.

In the position detecting sensor 10 according to the aforementioned present embodiment, it was described that the lower end surface of the engaging projection 26 is formed so as to be curved inwardly with an arcuate shape, however, the invention is not limited to such a feature. The lower end surface of the engaging projection 26 may also be formed with a flat or planar surface.

Figure 3:
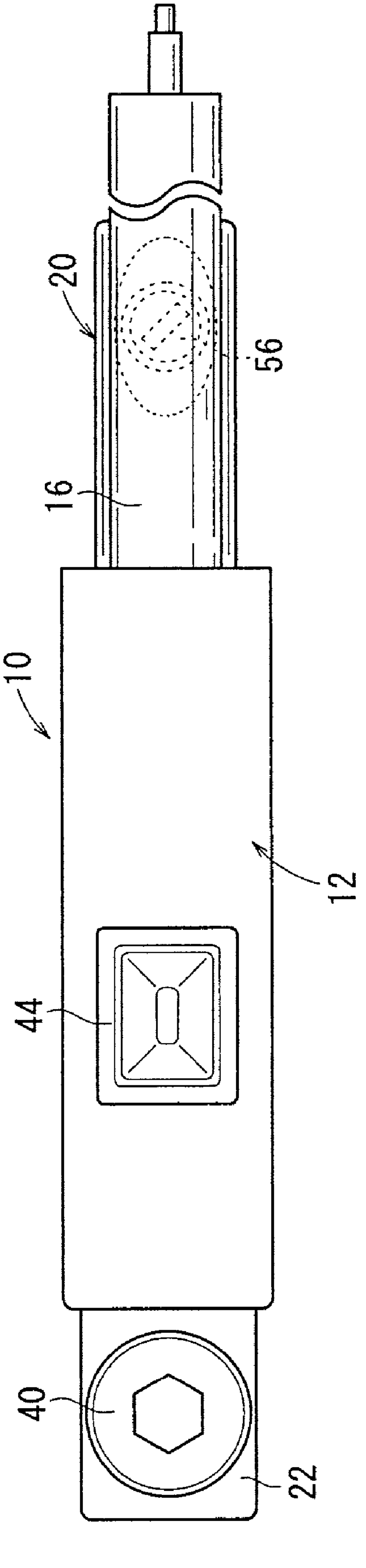
FIG. 3 is a plan view of the position detecting sensor and the fitting shown in FIG. 2.

Furthermore, as shown in FIGS. 2 and 3, the fitting 20 is structured so as to project a given length from the holder 12 on the side of the opening 18 of the holder 12. However, the fitting 20 also may project, for example, in an opposite manner, from the side of the connector 22 of the holder 12. Further, it is also acceptable for the fitting 20 to project respectively from both ends of the holder 12.

Next, with reference to FIGS. 10 through 22, modifications of the aforementioned position detecting sensor 10 shall be explained.

Figure 10:
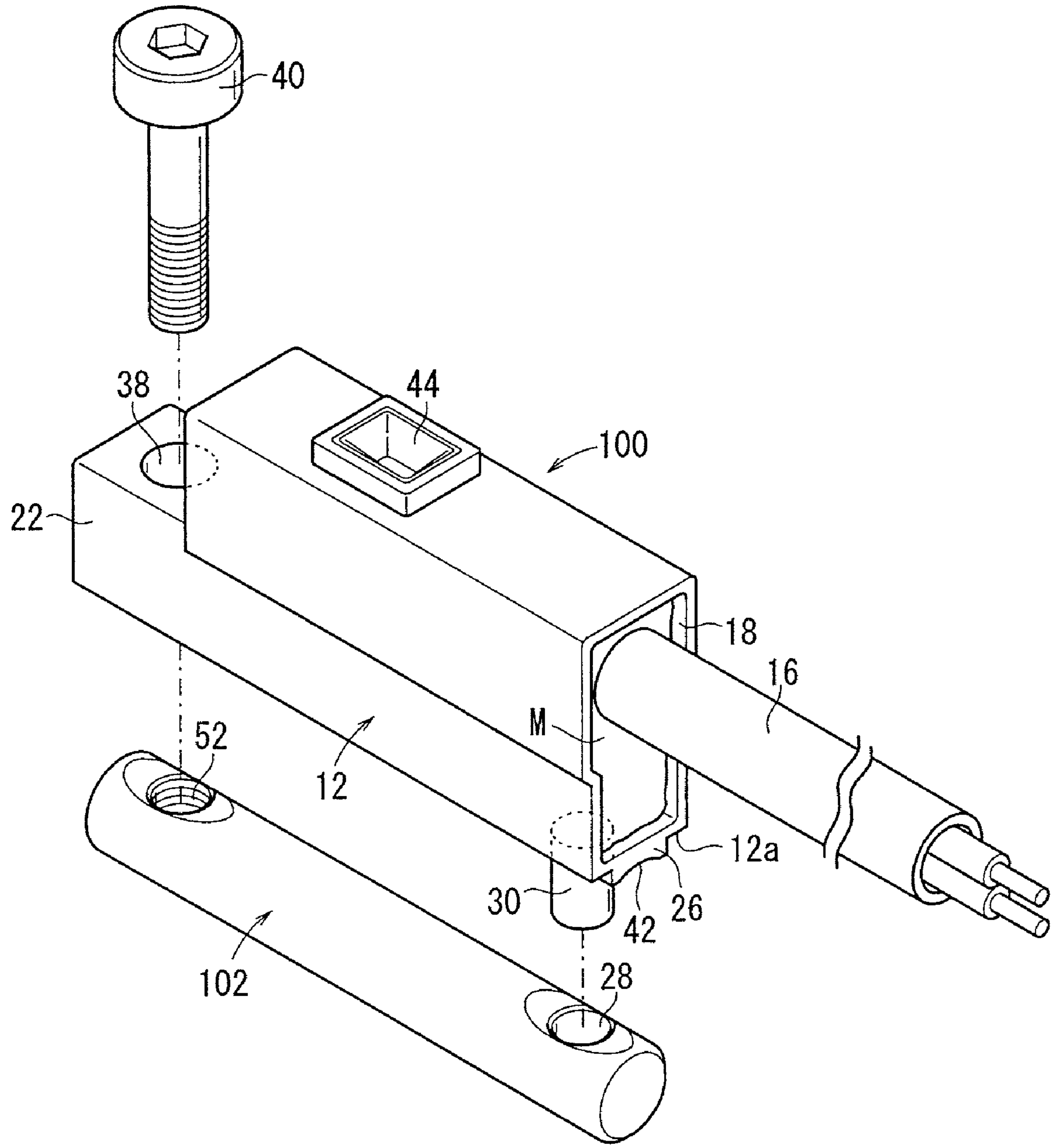
FIG. 10 is an exploded perspective view showing a state in which a fitting of the position detecting sensor according to a first modification is detached from the holder.
Figure 11:
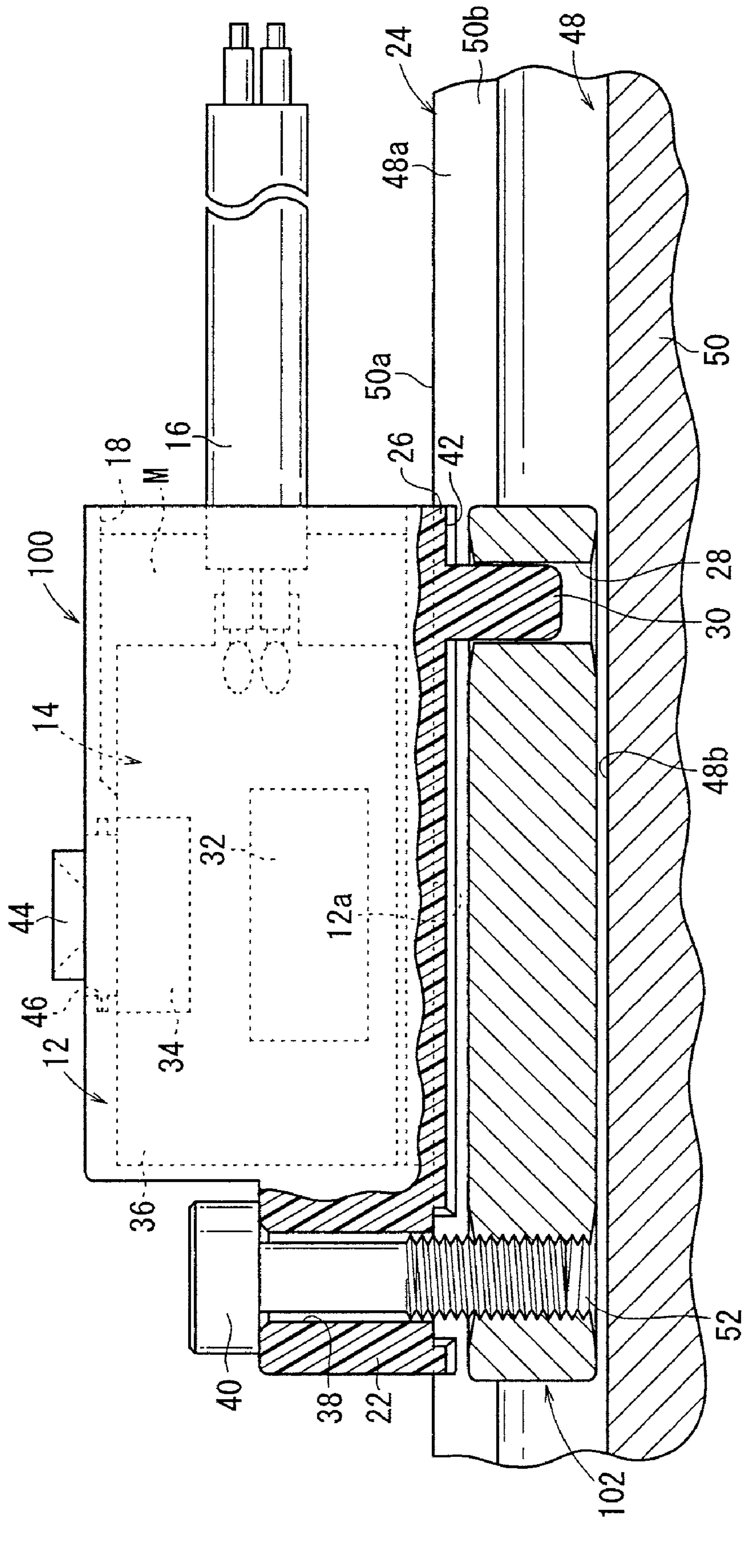
FIG. 11 is a vertical plan view showing a state in which the position detecting sensor shown in FIG. 10 is fixed with respect to a cylinder apparatus.

As illustrated in FIGS. 10 and 11, the position detecting sensor 100 according to a first modification differs from the fitting 20 of the aforementioned embodiment in that the fitting 102 making up the position detecting sensor 100 is formed with a length that is substantially equal to the longitudinal dimension of the holder 12. The first screw hole 52, in which the connecting bolt 40 is screw-engaged, is formed on one end of the fitting 102, and the pin hole 28, into which the pin 30 of the holder 12 is inserted, is formed on the other end of the fitting 102. That is, the fitting 102 also differs from the fitting 20 of the aforementioned embodiment in that it does not have the second screw hole 54 for threaded engagement of the fixing screw 56.

In this way, by adopting use of the fitting 102, having only the first screw hole 52 and the pin hole 28, compared to the aforementioned fitting 20, the fitting 102 can be made smaller in size, while the structure of the fitting 102 can be simplified and manufactured at low cost.

Figure 12:
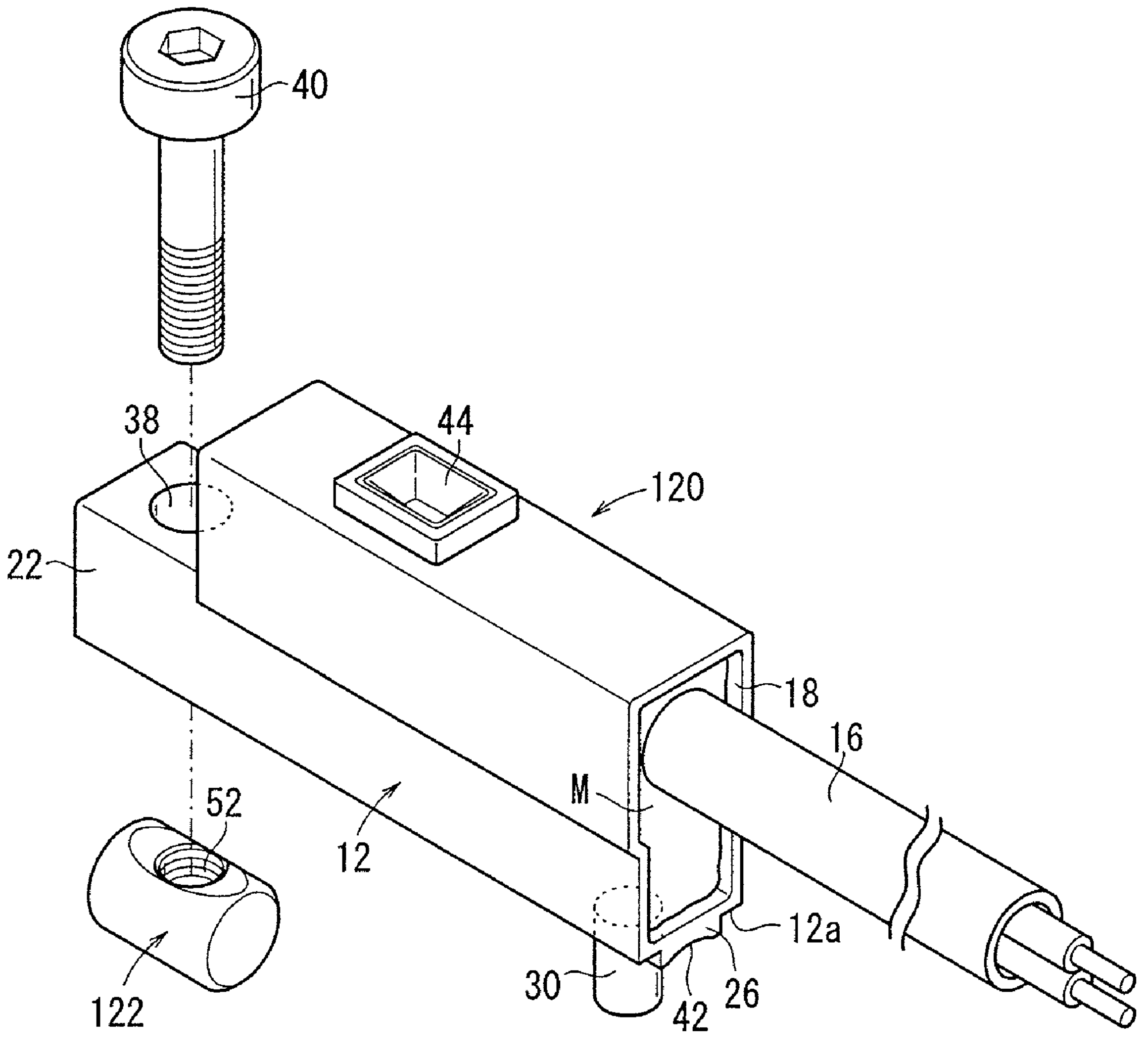
FIG. 12 is an exploded perspective view showing a state in which a fitting of a position detecting sensor according to a second modification is detached from the holder.
Figure 13:
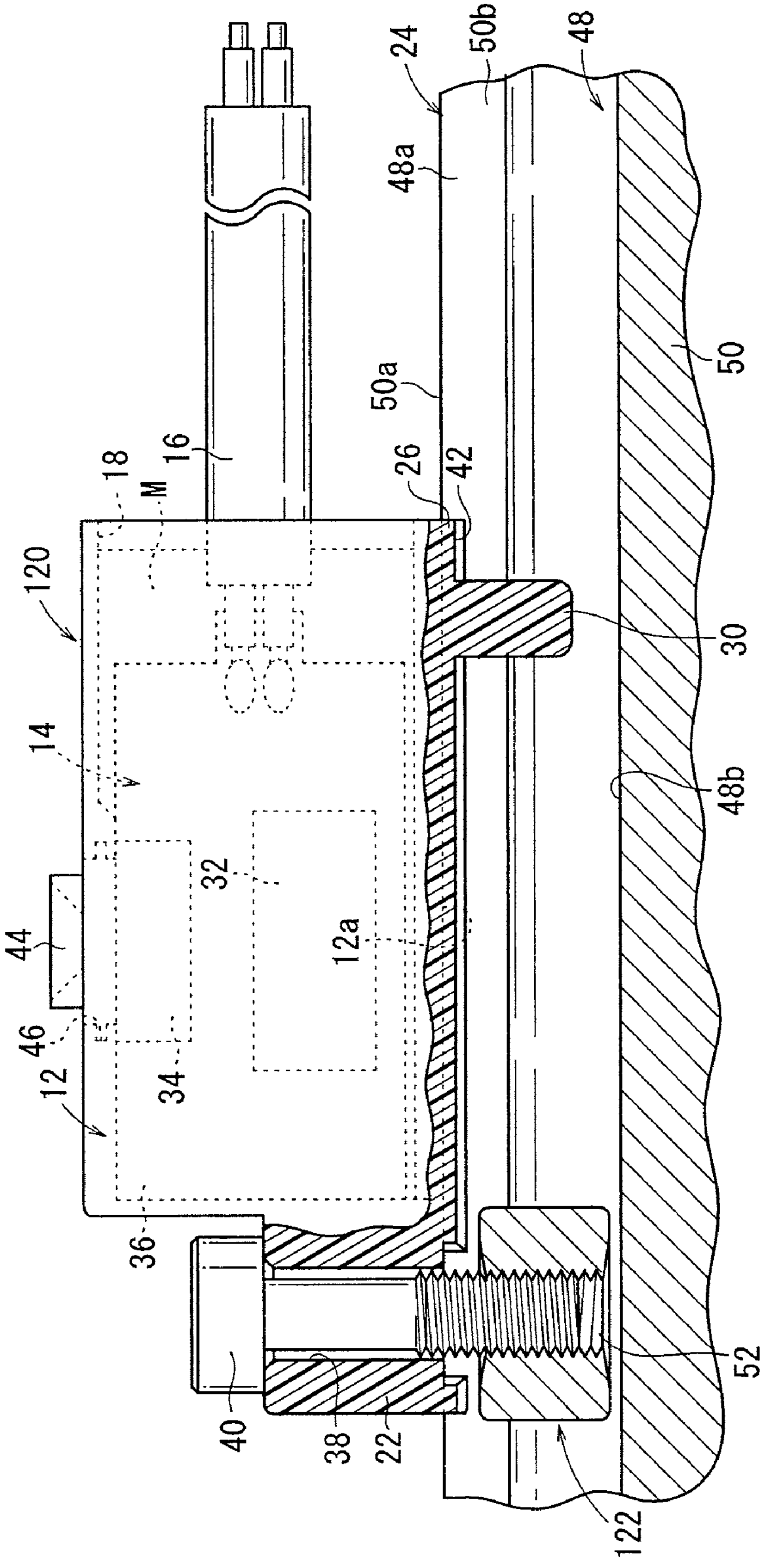
FIG. 13 is a vertical plan view showing a state in which the position detecting sensor shown in FIG. 12 is fixed with respect to a cylinder apparatus.

Further, as illustrated in FIGS. 12 and 13, in the position detecting sensor 120 according to a second modification, the fitting 122 is formed such that the length dimension thereof is made even shorter, compared to the fitting 102 of the position detecting sensor 100 according to the aforementioned first modification. The first screw hole 52, into which the connecting bolt 40 is threaded, is formed in the fitting 122 substantially centrally along the axial direction thereof. That is, the fitting 122 differs from the fitting 20 of the aforementioned embodiment in that it does not have the second screw hole 54 for screw-engagement of the fixing screw 56, or the pin hole 28 into which the pin 30 of the holder 12 is inserted. The fitting 122 also differs from the above-mentioned fitting 102 according to the first modification in that it does not have the pin hole 28.

In this manner, by adopting use of the fitting 122 having only the first screw hole 52, the fitting 122 can be made smaller in size, while the structure of the fitting 122 can be simplified and manufactured at low cost.

Figure 14:
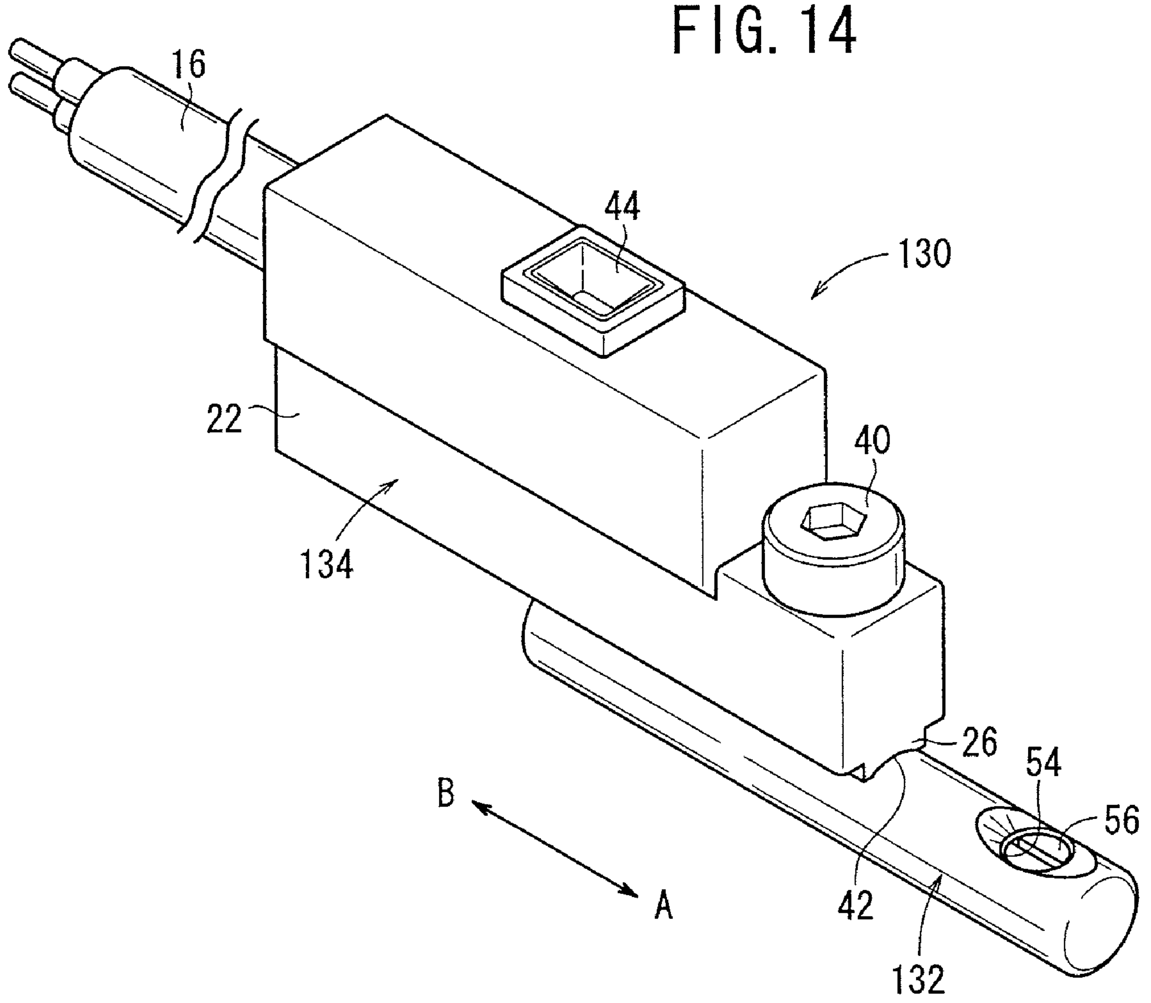
FIG. 14 is an external perspective view showing a position detecting sensor according to a third modification.
Figure 15:
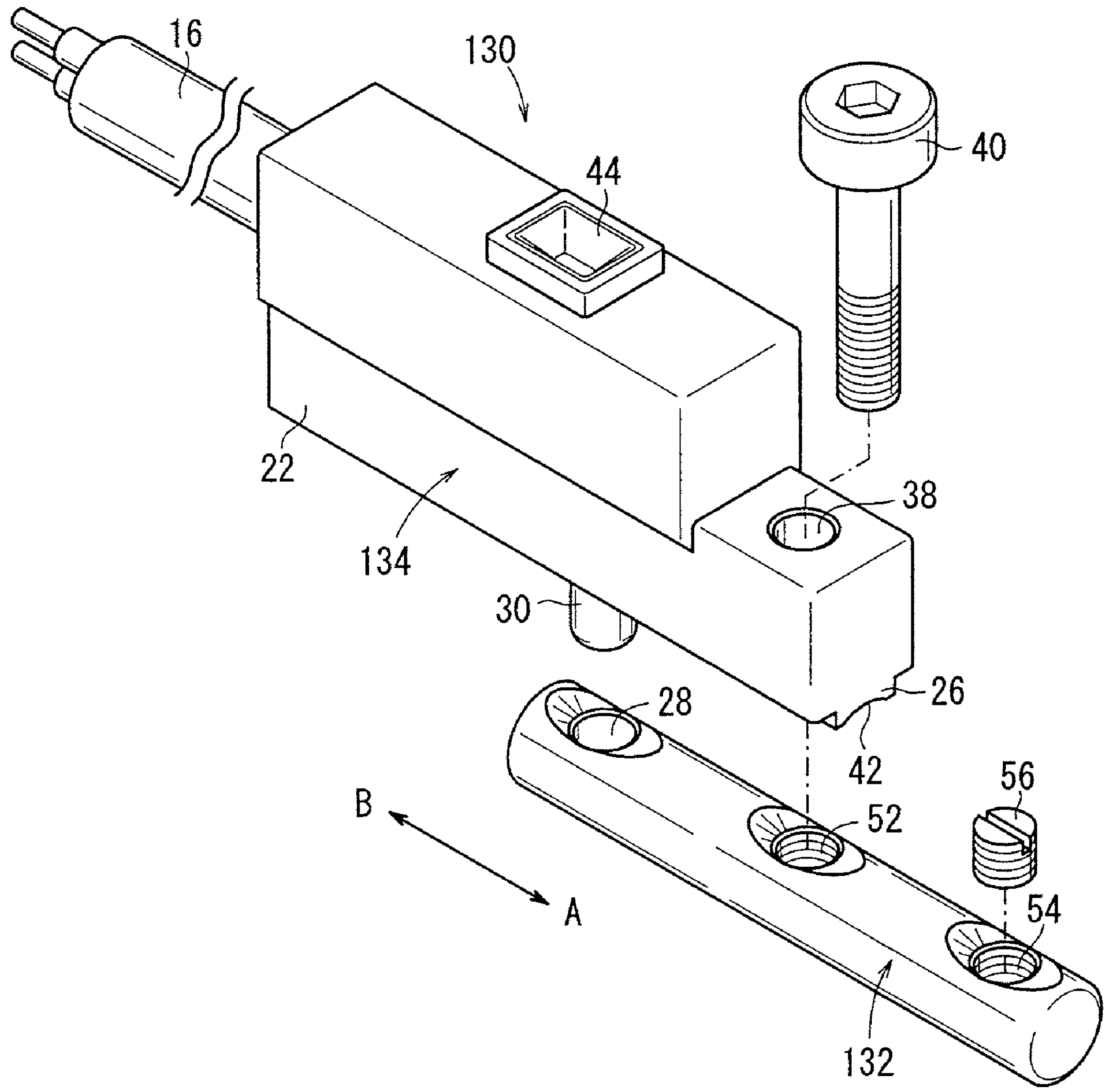
FIG. 15 is an exploded perspective view showing a state in which the fitting making up the position detecting sensor of FIG. 14 is detached from the holder.
Figure 16:
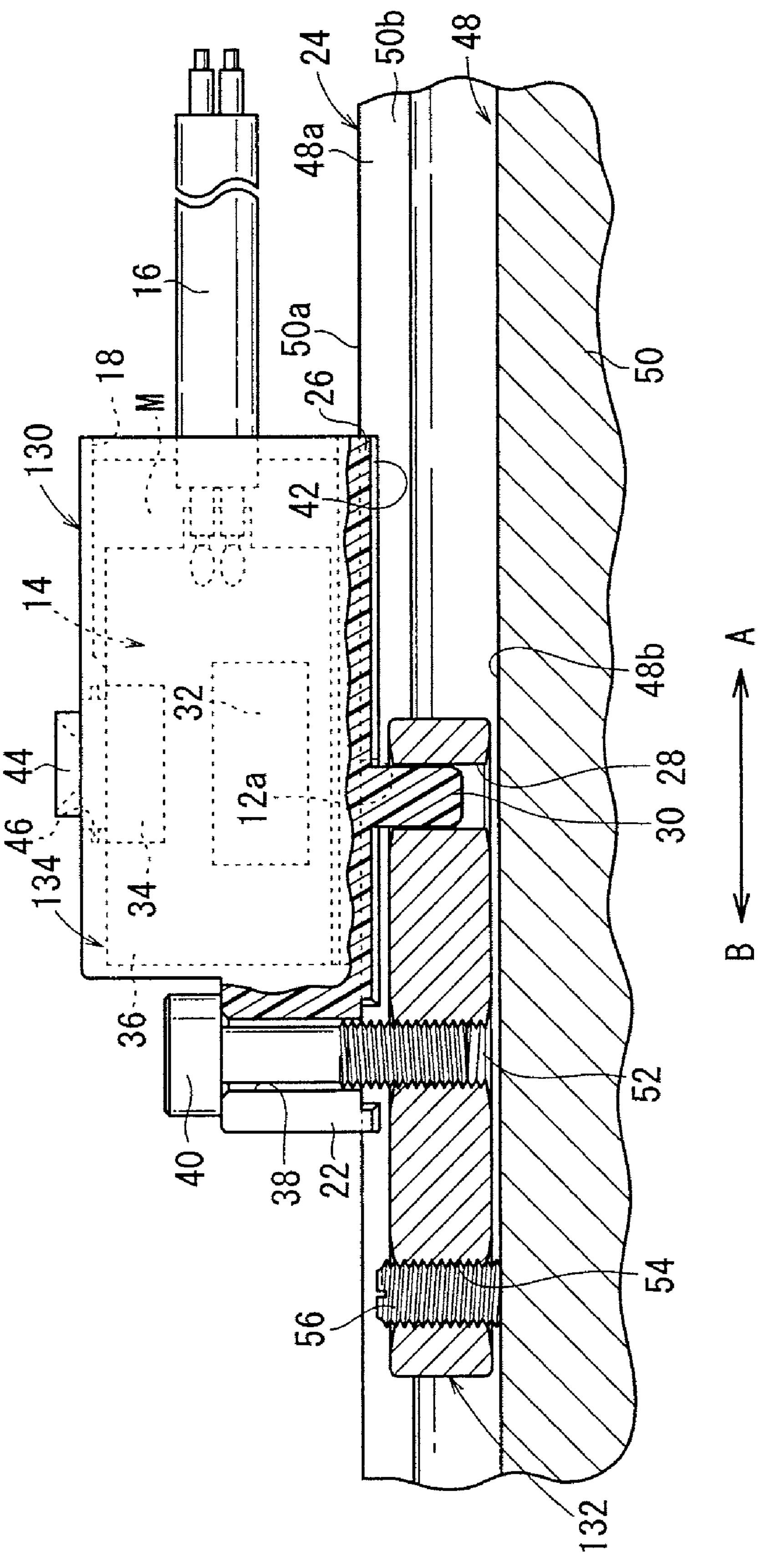
FIG. 16 is a vertical plan view showing a state in which the position detecting sensor shown in FIG. 14 is fixed with respect to a cylinder apparatus.

Further, as illustrated in FIGS. 14 to 16, in the position detecting sensor 130 according to a third modification, the fitting 132 therein is formed with a length dimension substantially equal to that of the fitting 102 of the aforementioned first modification, and the fitting 132 is installed while being offset on the side of the bolt hole 38 (in the direction of the arrow A) with respect to the holder 134. The fitting 132 has the first screw hole 52 formed in the fitting 132 substantially centrally along the axial direction thereof, into which the connecting bolt 40 is threaded, the second screw hole 54 formed on one end (in the direction of the arrow A), into which the fixing screw 56 is threaded, and the pin hole 28 formed on the other end (in the direction of the arrow B), into which the pin 30 of the holder 134 is inserted.

Specifically, the first screw hole 52, the second screw hole 54 and the pin hole 28 are disposed in the fitting 132 with predetermined separations therebetween along the axial direction.

Further the pin 30 of the holder 134 is disposed substantially centrally along the axial direction of the holder 134.

In this manner, in the position detecting sensor 130 according to the third modification, because the second screw hole 54 into which the fixing screw 56 is threaded is formed on one end (in the direction of the arrow A) of the fitting 132, and the fitting 132 is arranged so as to project from one end of the holder 134, when the fixing screw 56 is rotated and threaded, the lead wires 16 that project from the other end of the holder 134 do not disturb fixing operations of the position detecting sensor 130, and fixing of the position detecting sensor 130 through the fitting 132 can be performed securely and efficiently.

Further, because the longitudinal dimension of the fitting 132 is formed to be shorter than the fitting 20 of the position detecting sensor 10 according to the aforementioned embodiment of the invention, when the fitting 132 is fixed in the sensor groove 48, the contact area between the outer circumferential surface of the fitting 132 and the inner circumferential surface of the sensor groove 48 is made smaller. Owing thereto, when the fitting 132 is displaced toward the inner circumferential surface of the sensor groove 48 through threaded rotation of the fixing screw 56, the pressing load per unit area applied toward the sensor groove 48 from the fitting 132 can be made larger, and as a result, the position detecting sensor 130 can be firmly fixed with respect to the sensor groove 48.

Figure 17:
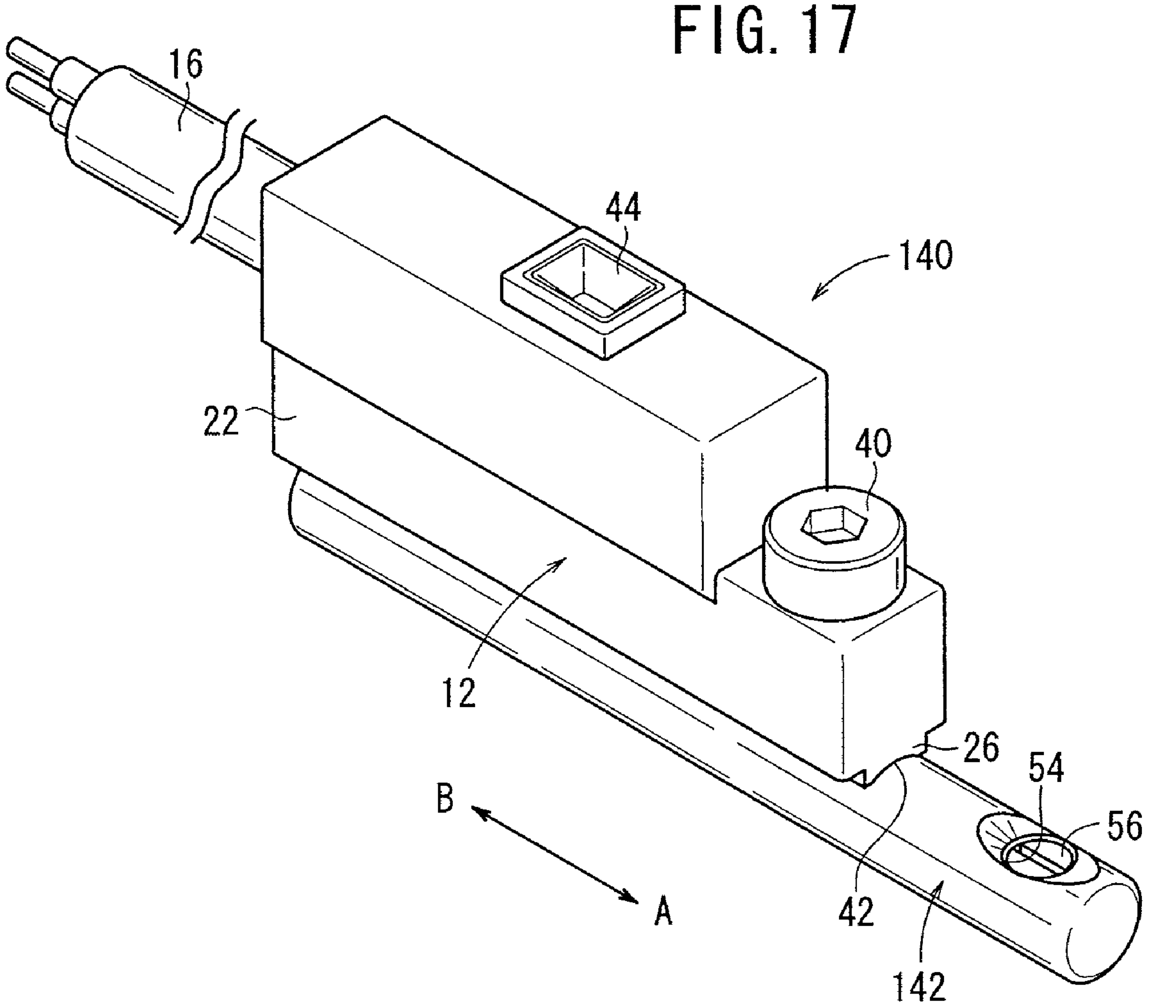
FIG. 17 is an external perspective view showing a position detecting sensor according to a fourth modification.
Figure 18:
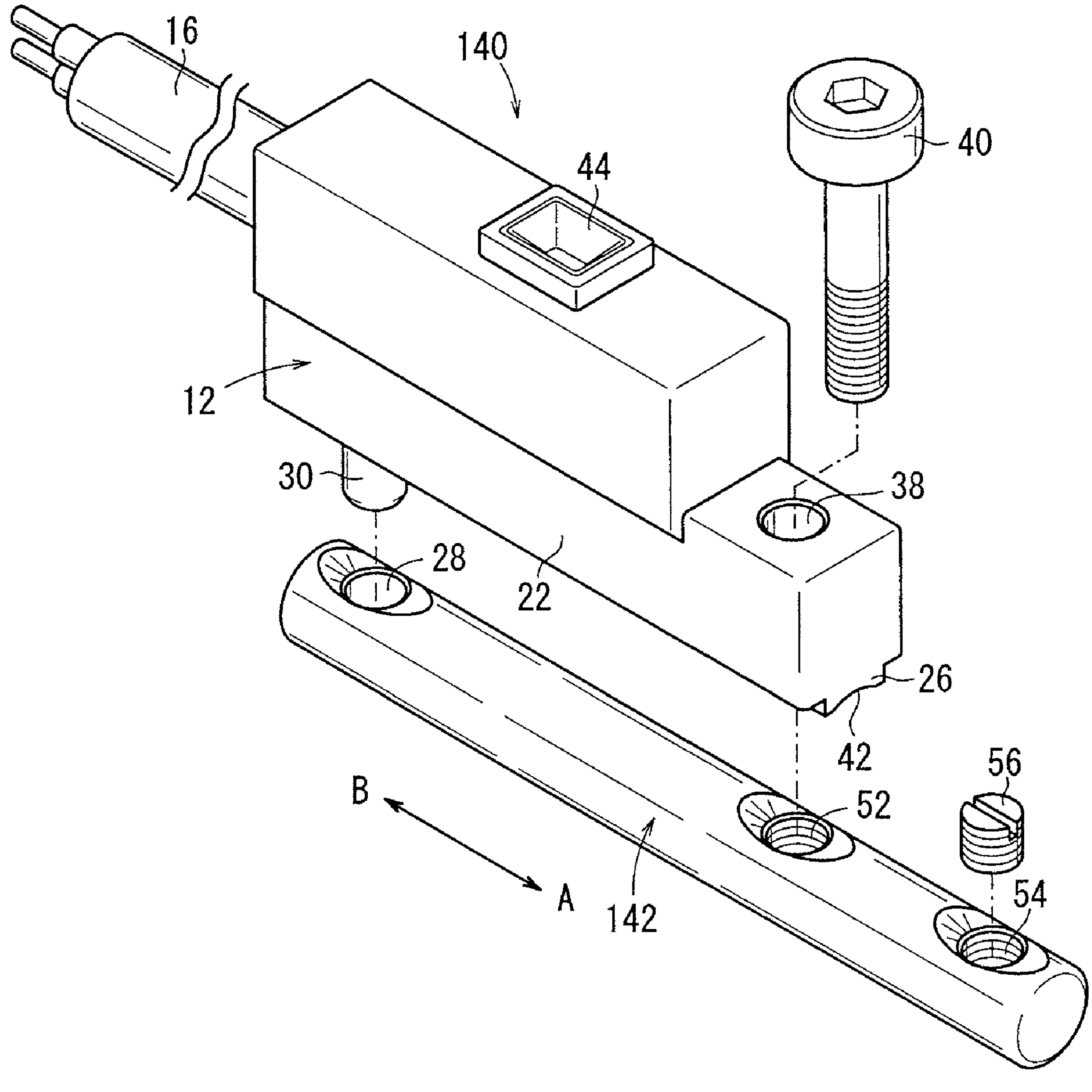
FIG. 18 is an exploded perspective view showing a state in which the fitting making up the position detecting sensor of FIG. 17 is detached from the holder.
Figure 19:
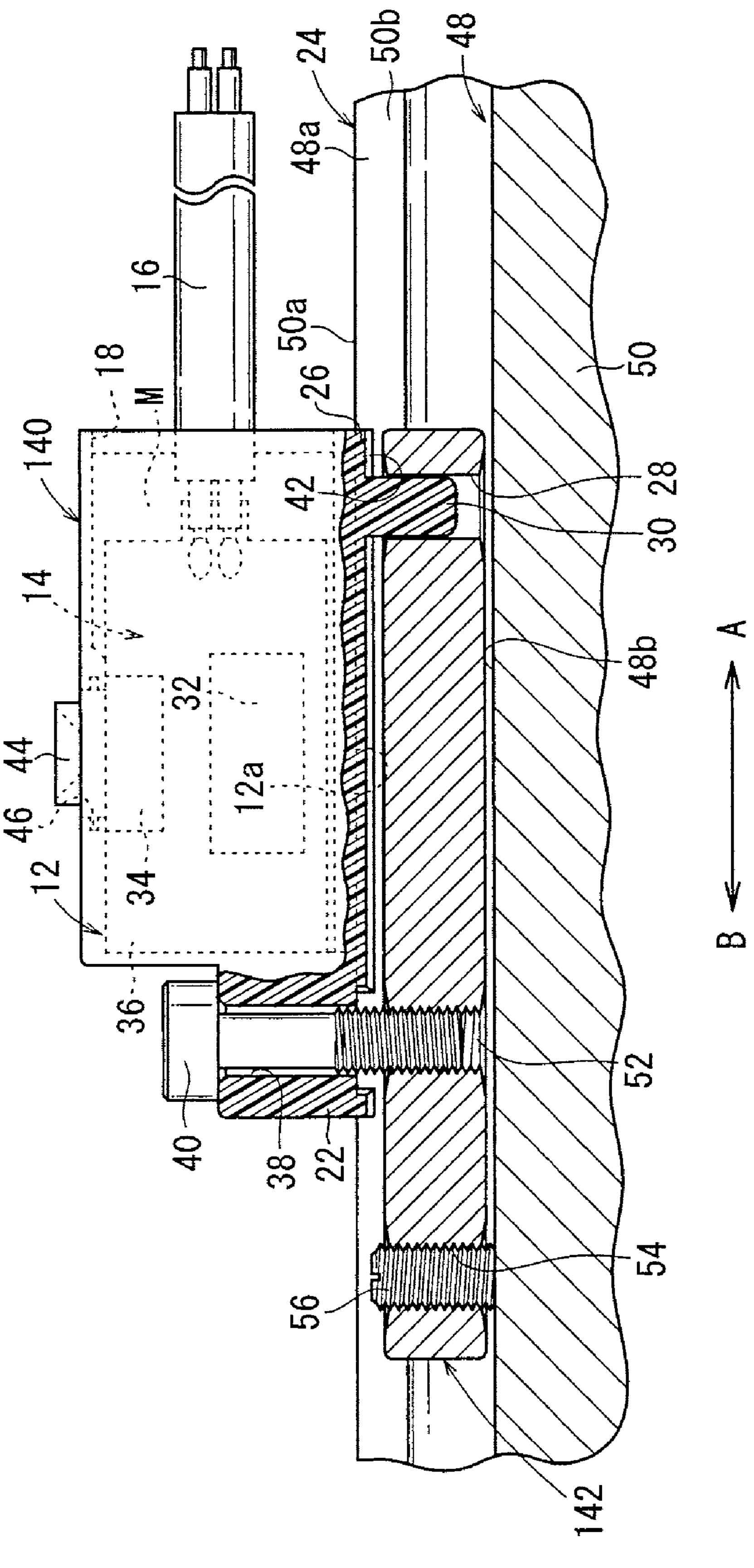
FIG. 19 is a vertical plan view showing a state in which the position detecting sensor shown in FIG. 17 is fixed with respect to a cylinder apparatus.

Still further, as illustrated in FIGS. 17 to 19, in the position detecting sensor 140 according to a fourth modification, the fitting 142 is formed such that the longitudinal dimension thereof is substantially equal to that of the fitting 20 of the position detecting sensor 10 according to the embodiment of the invention, yet differs from the position detecting sensor 10 according to the aforementioned embodiment of the invention in that the fitting 142 is arranged so as to project from the end (in the direction of the arrow A) of the holder 12, having the bolt hole 38 therein.

One end (in the direction of the arrow A) of the fitting 142 is arranged so as to project a predetermined length from the end of the holder 12, and is formed with a first screw hole 52 therein into which the connecting bolt 40 is threaded, at a position facing the end of the holder 12. Further, a second screw hole 54, into which the fixing screw 56 is threaded, is formed in the one end of the fitting 142, whereas a pin hole 28 into which the pin 30 of the holder 12 is inserted is formed in the other end of the fitting 142.

In this manner, in the position detecting sensor 140 according to the fourth modification, because the second screw hole 54 into which the fixing screw 56 is threaded is formed on one end (in the direction of the arrow A) of the fitting 142, and the fitting 142 is arranged so as to project from the one end of the holder 12, when the fixing screw 56 is rotated and threaded, the lead wires 16 that project from the other end of the holder 12 do not disturb fixing operations of the position detecting sensor 140, and fixing of the position detecting sensor 140 through the fitting 142 can be performed securely and efficiently.

Figure 20:
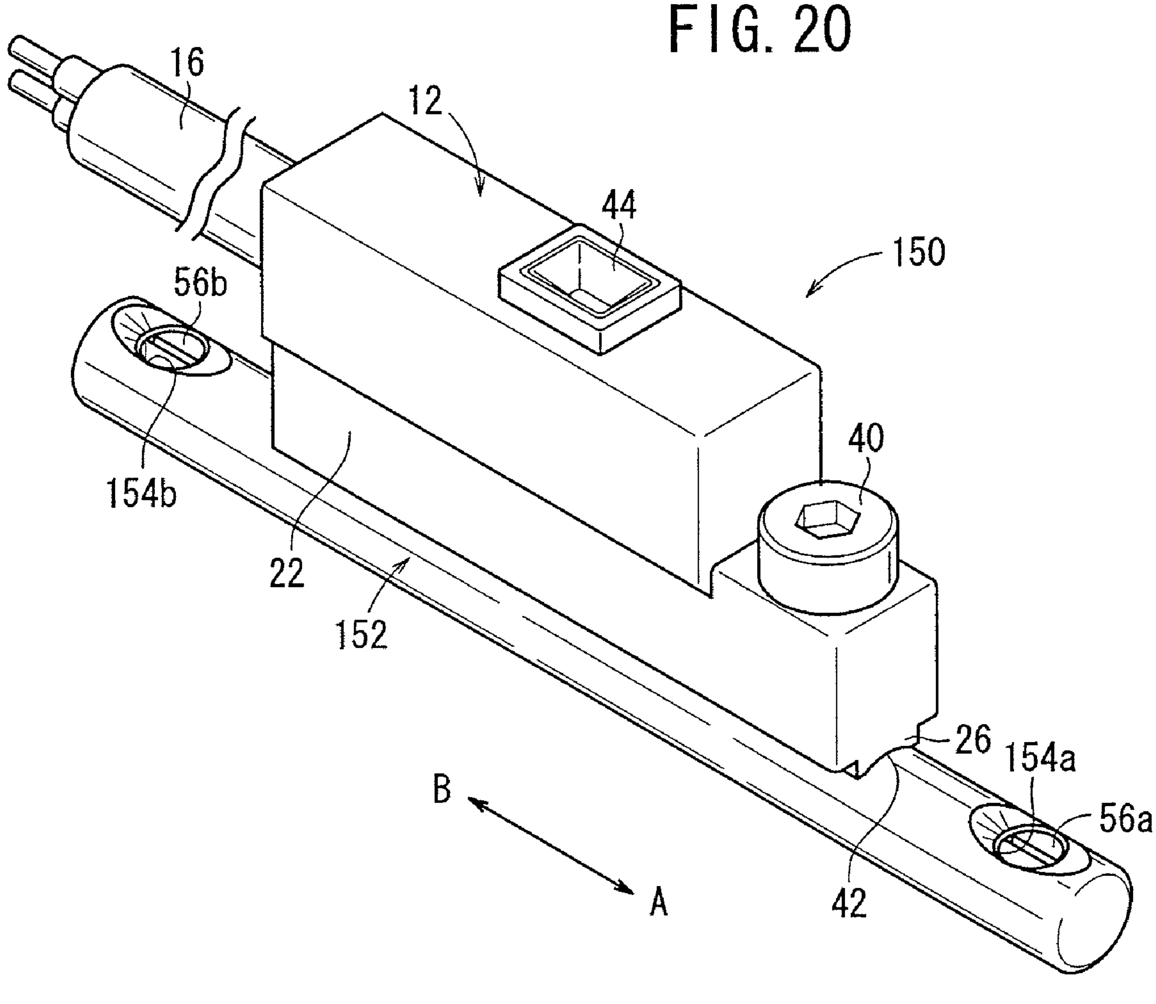
FIG. 20 is an external perspective view showing a position detecting sensor according to a fifth modification.
Figure 21:
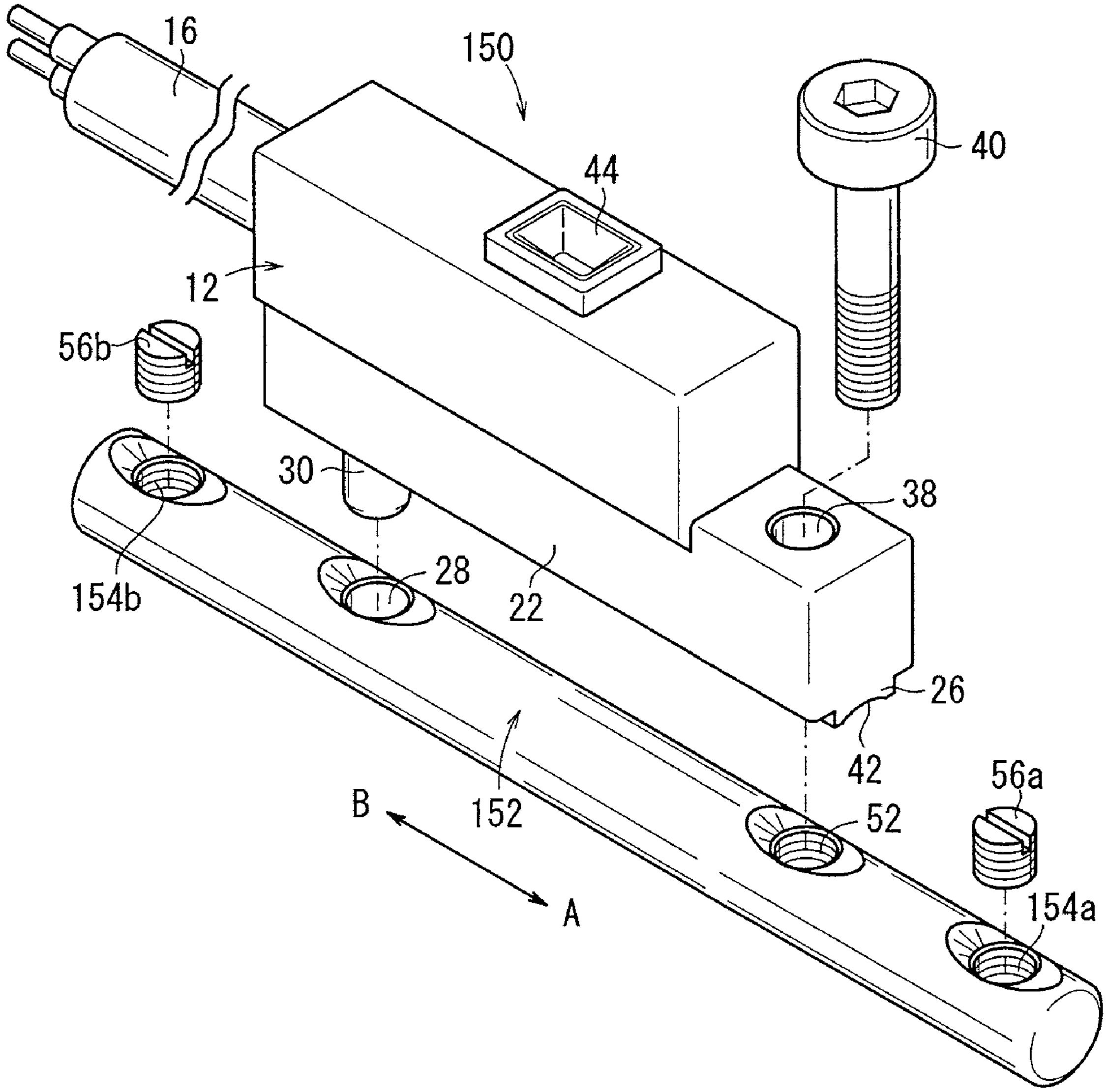
FIG. 21 is an exploded perspective view showing a state in which the fitting making up the position detecting sensor of FIG. 20 is detached from the holder.
Figure 22:
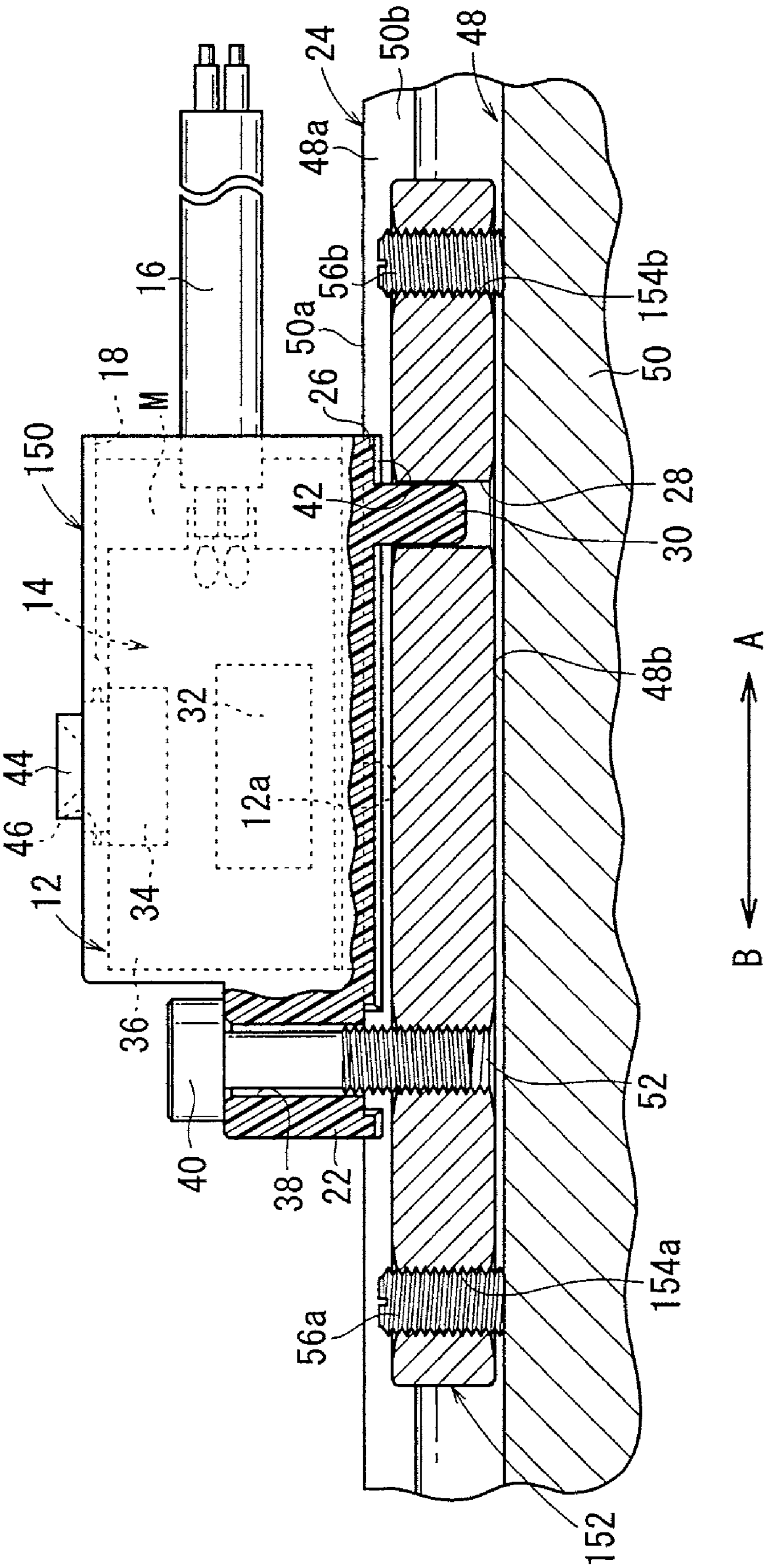
FIG. 22 is a vertical plan view showing a state in which the position detecting sensor shown in FIG. 20 is fixed with respect to a cylinder apparatus.

Still further, as illustrated in FIGS. 20 to 22, the position detecting sensor 150 according to a fifth modification differs from the position detecting sensor 10 according to the aforementioned embodiment of the invention in that the fitting 152 is arranged so as to project respectively from both ends of the holder 12 constituting the position detecting sensor 150.

The fitting 152 is formed with a longitudinal dimension larger than that of the holder 12, such that when the fitting 152 is installed with respect to the holder 12, both ends of the fitting 152 project respectively a predetermined length from respective ends of the holder 12.

The first screw hole 52 facing the bolt hole 38 of the holder 12 is formed in one end (in the direction of the arrow A) of the fitting 152, whereas the pin hole 28 into which the pin 30 of the holder 12 is inserted is formed in the other end (in the direction of the arrow B) of the fitting 152.

Further, a pair of second screw holes 154*a*, 154*b*, into which fixing screws 56*a*, 56*b* are threaded, are formed on the respective ends of the fitting 152.

In this manner, in the position detecting sensor 150 according to the fifth modification, the pair of fixing screws 56*a*, 56*b* are disposed through the second screw holes 154*a*, 154*b* on both ends of the fitting 152, whereby the fitting 152 can be fixed within the sensor groove 48 by means of the fixing screws 56*a*, 56*b*. Owing thereto, the position detecting sensor 150 including the fitting 152 can be more securely and firmly fixed in place. Further, either one of the pair of fixing screws 56*a*, 56*b* can be selected and used for fixing the position detecting sensor 150, corresponding to a fixing position thereof with respect to the sensor groove 48.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A position detecting sensor installed in a groove provided on a side surface of an actuator, for detecting the position of a displacement body in said actuator, comprising:

a holder accommodating a detector therein for detecting said displacement body and disposed on said side surface so as to face said groove;

a fitting formed of a metal material, for insertion into said groove; and a connecting member connecting said holder and said fitting, wherein said holder and said fitting are pulled mutually in a direction to approach each other by said connecting member, and a portion of said actuator is maintained between said holder and said fitting, and wherein said holder includes a connector portion for connecting said fitting via said connecting member, and an engagement member that engages with said fitting, said holder being positioned with respect to said fitting by an engaging action of said engagement member.

2. The position detecting sensor according to claim 1, wherein said connecting member is inserted in said connector portion and is screw-engaged with respect to said fitting.

3. The position detecting sensor according to claim 1, wherein said holder includes a projection, which projects on said holder toward said actuator and is inserted into said groove.

4. A position detecting sensor installed in a groove provided on a side surface of an actuator, for detecting the position of a displacement body in said actuator, comprising:

a holder accommodating a detector therein for detecting said displacement body and disposed on said side surface so as to face said groove;

a fitting formed of a metal material, for insertion into said groove; and a connecting member connecting said holder and said fitting, wherein said holder and said fitting are pulled mutually in a direction to approach each other by said connecting member, and a portion of said actuator is maintained between said holder and said fitting, and wherein a fixing member capable of fixing said fitting with respect to said groove is provided on said fitting.

5. The position detecting sensor according to claim 4, wherein said fitting has a screw hole therein, and said fixing member comprises a fixing screw, which is screw-engaged in said screw hole that penetrates in a direction perpendicular to an axial line of said fitting.

6. The position detecting sensor according to claim 5, wherein, by displacement of said fixing screw toward said groove and abutment against a bottom portion thereof, said fitting with which said fixing screw is screw-engaged is displaced toward said holder.

7. The position detecting sensor according to claim 4, wherein said fitting has a predetermined length in the axial direction, and is formed from a shaft having a circular cross sectional shape corresponding to a cross sectional shape of said groove.

8. The position detecting sensor according to claim 7, wherein a length along an axial direction of said fitting is longer than a length along an axial direction of said holder, and wherein said fixing member is disposed in a region that projects with respect to an end of said holder.

9. The position detecting sensor according to claim 7, wherein a length along an axial direction of said fitting is shorter than a length along an axial direction of said holder.

10. The position detecting sensor according to claim 7, wherein a length along an axial direction of said fitting is equal to a length along an axial direction of said holder.

* * * * *